(12) United States Patent
Okada

(10) Patent No.: US 7,664,112 B2
(45) Date of Patent: Feb. 16, 2010

(54) PACKET PROCESSING APPARATUS AND METHOD

(75) Inventor: Tetsuya Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 11/649,839

(22) Filed: Jan. 5, 2007

(65) Prior Publication Data
US 2007/0160052 A1 Jul. 12, 2007

(30) Foreign Application Priority Data
Jan. 6, 2006 (JP) ............................ 2006-001076
Dec. 12, 2006 (JP) ............................ 2006-334489

(51) Int. Cl.
*H04L 12/28* (2006.01)
*H04L 12/54* (2006.01)

(52) U.S. Cl. .................................. 370/392; 370/395.41

(58) Field of Classification Search ........................ None
See application file for complete search history.

(56) References Cited

U.S. PATENT DOCUMENTS 5,463,777 A * 10/1995 Bialkowski et al. ......... 707/102
5,838,681 A * 11/1998 Bonomi et al. .......... 370/395.41
6,678,269 B1 * 1/2004 Michels et al. ............... 370/389
2002/0023080 A1 * 2/2002 Uga et al. ........................ 707/1
2002/0062394 A1 * 5/2002 Bunn et al. ................... 709/246
2006/0203721 A1 * 9/2006 Hsieh et al. .................. 370/229

FOREIGN PATENT DOCUMENTS

JP 11-308218 11/1999
JP 2004-015561 1/2004
JP 2004-158903 6/2004

* cited by examiner

*Primary Examiner*—Chirag G Shah
*Assistant Examiner*—Jenkey Van
(74) *Attorney, Agent, or Firm*—Staas & Halsey LLP

(57) ABSTRACT

A packet processing apparatus includes a packet processing engine and a search engine connected through a bus having a bandwidth which is equal to or greater than a total transmission bandwidth of one or more receiving ports. The packet processing engine is configured to append a device internal header containing a search key to each of the packets, transfer the packets to the search engine through the bus, and receive the packets whose device internal headers are provided with search result information from the search engine through the bus. The search engine includes a packet buffer for temporarily storing the packets, a search processing part for performing search processing on the basis of the search key in the device internal header, and means for transferring the search result information from the search processing part and the packets stored in the packet buffer to the packet processing engine.

11 Claims, 15 Drawing Sheets

PACKET PROCESSING APPARATUS AND METHOD

BACKGROUND OF THE INVENTION

1. Field of the Invention

The present invention relates to a packet processing apparatus and a packet processing method which permit an increase in packet transmission speed while maintaining high reliability.

2. Description of the Related Art

Packet processing apparatuses such as routers which perform packet transmission processing using Internet protocols (IPs) or the like generally include packet processing engines and searching engines. When performing packet transmission processing, the packet processing apparatuses perform search processing on the basis of address information contained in the headers of packets and information on data contents, thus determining transmission destinations and transmission control information. Devices such as network processors (NWPs) are applied in the packet processing engines, and devices such as content-addressable memories (CAMs) are applied in the searching engines which search transmission destinations and transmission control information on the basis of packet information.

When performing search processing, a packet processing engine provides a search engine with a portion of a packet as a search key necessary for processing such as address determination or filtering. Upon receiving search result information from the search engine, the packet processing engine performs postprocessing on the basis of the search result information so as to send out the packet.

A network processor applied in the packet processing engine can be a RISC (Reduced Instruction Set Computer)-type processor or a data-flow-type processor. However, although RISC-type processors are capable of handling complex processing, necessary processing time increases with increasing complexity of processing, thus resulting in degradation of performance. On the other hand, with data-flow-type network processors, processing speed can be increased more easily compared with the RISC-type processors, and processing performance is not dependent on the types of packet. However, data-flow-type processors have limited capability in terms of the amount of processing which can be performed for one packet, and therefore are not capable of complex processing.

The recent development of high-speed data transmission of several Gbps or more has lead to the necessity of an increase in the processing speed of devices such as routers for performing packet transmission processing. For example, Japanese Unexamined Patent Application Publication No. 2004-015561 describes a packet processing apparatus provided with a search engine having an associative memory, a first processor serving to process packets before the packets are sent to the search engine, and a second processor serving to perform relay processing on the packets on the basis of search result information obtained from the search engine. As another example, Japanese Unexamined Patent Application Publication No. 2004-158903 describes a packet processing apparatus in which each of a plurality of incoming packets is appended with a sequence number and the individual packets are distributed across a plurality of packet analyzing means. Each of the plurality of packet analyzing means parallelly analyzes the distributed packet, and the analyzed packets are rearranged in the original order on the basis of the sequence numbers.

SUMMARY OF THE INVENTION

As described above, with the broadened bandwidth of a primary line for transmitting packets, the necessity has arisen to increase packet transmission speed. Along with this, various services and processing functions are also needed. Such processing functions include not only transmission of packets but also packet filtering, packet classification, and load dispersion. However, devices used as packet processing engines such as network processors and searching engines used for search processing have limited processing capability. Therefore, when complex processing is performed, there may be a case where processing to be performed for one packet fails to be completed within a predetermined time frame for packet processing, resulting in a decrease in the relay processing speed of the packet processing engines.

In addition, for example, when search processing is performed for searching an extremely large routing table or when a large amount of data is analyzed, the search processing can be a bottleneck in packet processing. Moreover, when a general-purpose network processor is employed in, the bandwidth of a bus for connecting the network processor to the search engine is narrow, which limits the size of a search key to be provided from the packet processing engine to the search engine. Furthermore, an error which occurs during packet transmission can be checked using a CRC (Cyclic Redundancy Check) appended to a packet. However, there has been little corrective action taken for an error which occurs within a packet processing apparatus such as a router. Thus, it is likely that a packet which contains an error is transmitted to a destination device.

The present invention has been made in view of the above circumstances, and thus serves to achieve high speed processing with high reliability and low cost.

Accordingly, a packet processing apparatus according to an embodiment of the present invention includes a packet processing engine and a search engine. The packet processing engine and the search engine are connected through a bus having a bandwidth which is equal to or greater than a total transmission bandwidth of one or more receiving ports which are, for example, connected to a primary line used for transferring packets. In this packet processing apparatus, the packet processing engine is configured to append a device internal header containing a search key to each of the packets received from the one or more receiving ports, transfer the packets appended with the device internal headers to the search engine through the bus, and receive the packets whose device internal headers are provided with search result information from the search engine through the bus. The search engine is configured to include a packet buffer for temporarily storing the packets transferred from the packet processing engine through the bus, a search processing part for performing search processing on the basis of the search key in the device internal header, and means for transferring the search result information from the search processing part and the packets stored in the packet buffer to the packet processing engine through the bus.

The search engine includes a sequence number management part for providing a sequence number to each of the packets received from the packet processing engine, managing storage information of the packets for the packet buffer on the basis of the sequence numbers of the packets, and maintaining a transmission order of the packets for loop processing performed with the packet processing engine on the basis of the sequence numbers.

The search engine can be provided with a scheduler for selecting an output queue corresponding to the packets on the basis of the search result information from the search processing part and performing scheduling for each output queue so as to transfer the packets to the packet processing engine.

This configuration facilitates transfer of each of the packets appended with the device internal header between the packet processing engine and the search engine and permits packet processing using a data-flow-type network processor for the packet processing engine. In addition, loop processing performed between the packet processing engine and the search engine facilitates complex processing which is sequentially performed in the packet processing engine. Moreover, by installing a scheduler having a function of a traffic manager in the search engine, the complexity of configuration can be reduced.

DESCRIPTION OF THE PREFERRED EMBODIMENTS

The preferred embodiment of the present invention will be described with reference to the accompanying drawings.

Figure 1:
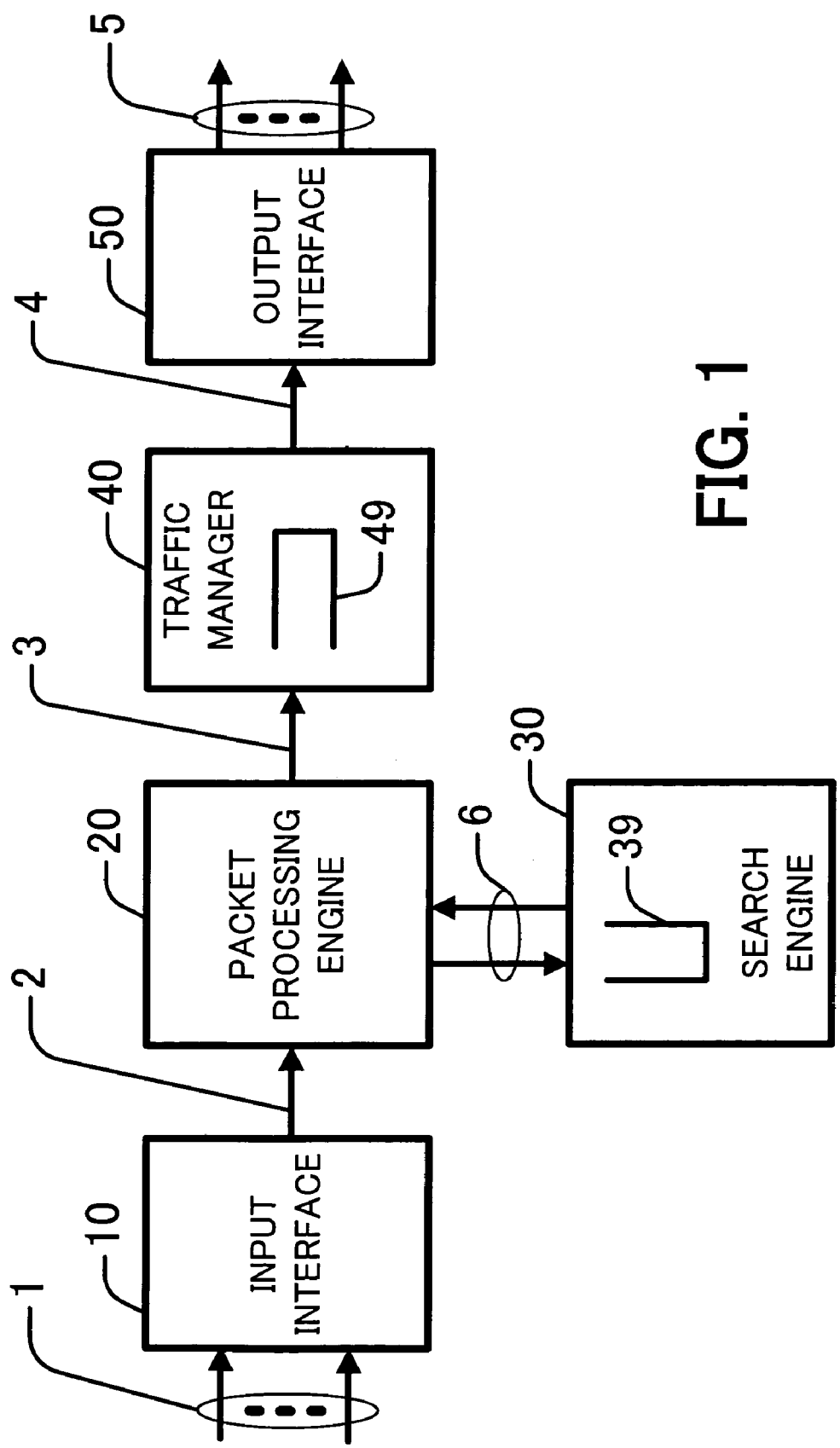
FIG. 1 is an exemplary block diagram illustrating a packet processing apparatus according to a first embodiment of the present invention.

FIG. 1 is an exemplary block diagram illustrating a packet processing apparatus according to a first embodiment of the present invention.

The packet processing apparatus includes an input interface 10, a packet processing engine 20, a search engine 30, a traffic manager 40, an output interface 50, the packet buffer 39, and a packet buffer 49.

Figure 9:
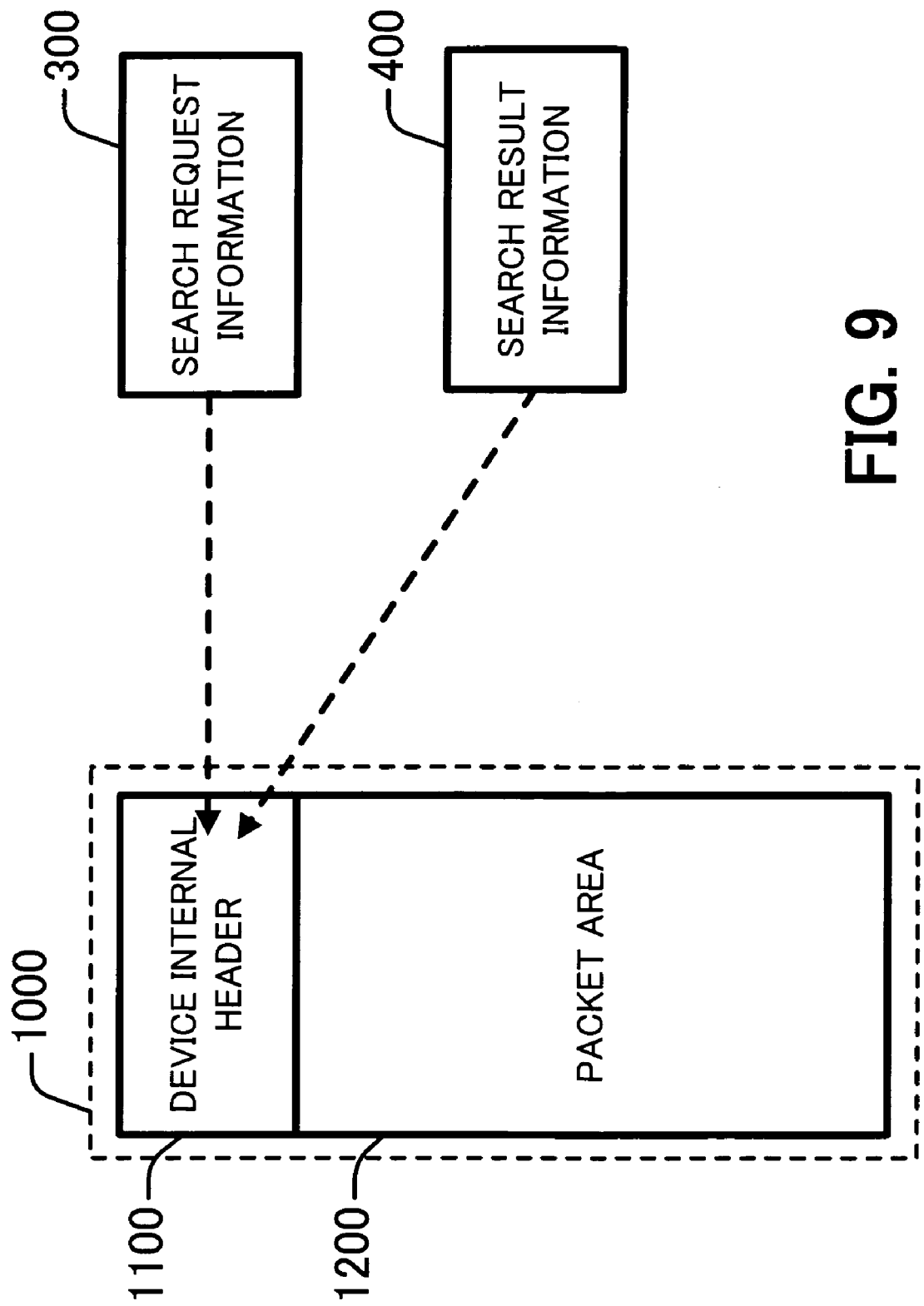
FIG. 9 illustrates an exemplary format of a search request block and a search result block, according to an embodiment of the present invention.

The input interface 10 receives packets from one or more receiving ports 1, which are, for example, connected to the primary line, and delivers the received packets to the packet processing engine 20 via a communication link 2. Upon receiving a packet from the input interface 10, the packet processing engine 20 performs processing including determining the type of the packet such as IPv4, IPv6, or MPLS (Multi-Protocol Label Switching) and verifying the normality of the packet. The processing also includes extracting search keys necessary for processing such as address search, filtering search, and classification search. After completing the above processing, the packet processing engine 20 appends a fixed-length device internal header to the packet to build a search request block which, for example, can be built as shown in FIG. 9. In this device internal header, search request information including, for example, keys used for search processing in the search engine 30 and a value representing the packet type is stored. The search request block built as above is transmitted to the search engine 30 via a communication link 6.

Figure 10:
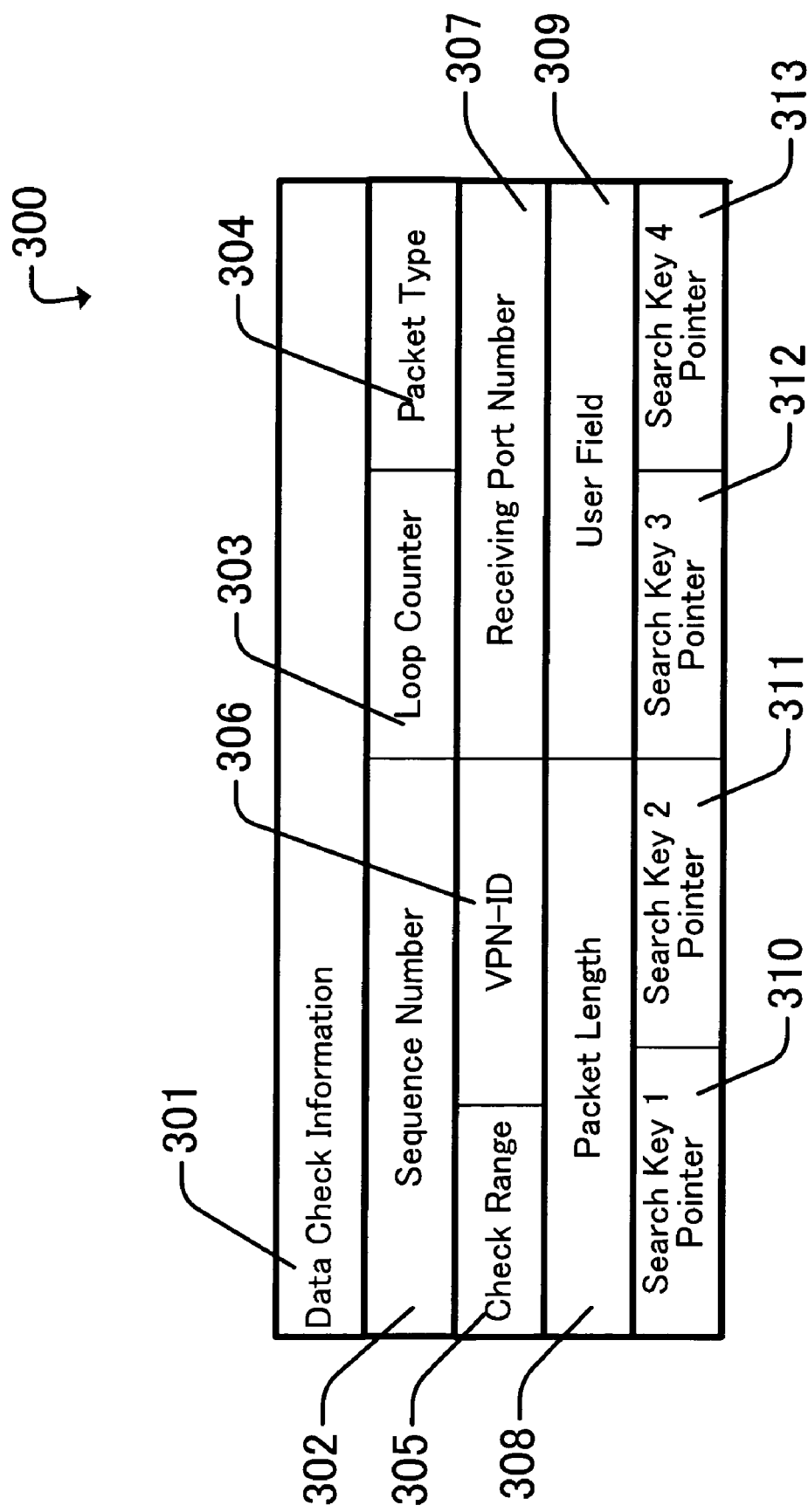
FIG. 10 illustrates an exemplary format of search request information which is stored in a device internal header.

If a search key of a large data size such as a destination address key is appended to the device internal header, the header size becomes large. Therefore, a pointer indicating the location of the search key can be set in the search request information stored in the device internal header. A search key whose location is not dependent on packet type does not need to be indicated by a pointer. The above-mentioned search request information, for example, can be made as shown in FIG. 10 which will be described later.

The search engine 30 performs search processing on the basis of the search request information stored in the device internal header of the search request block which has been transmitted from the packet processing engine 20.

Figure 12:
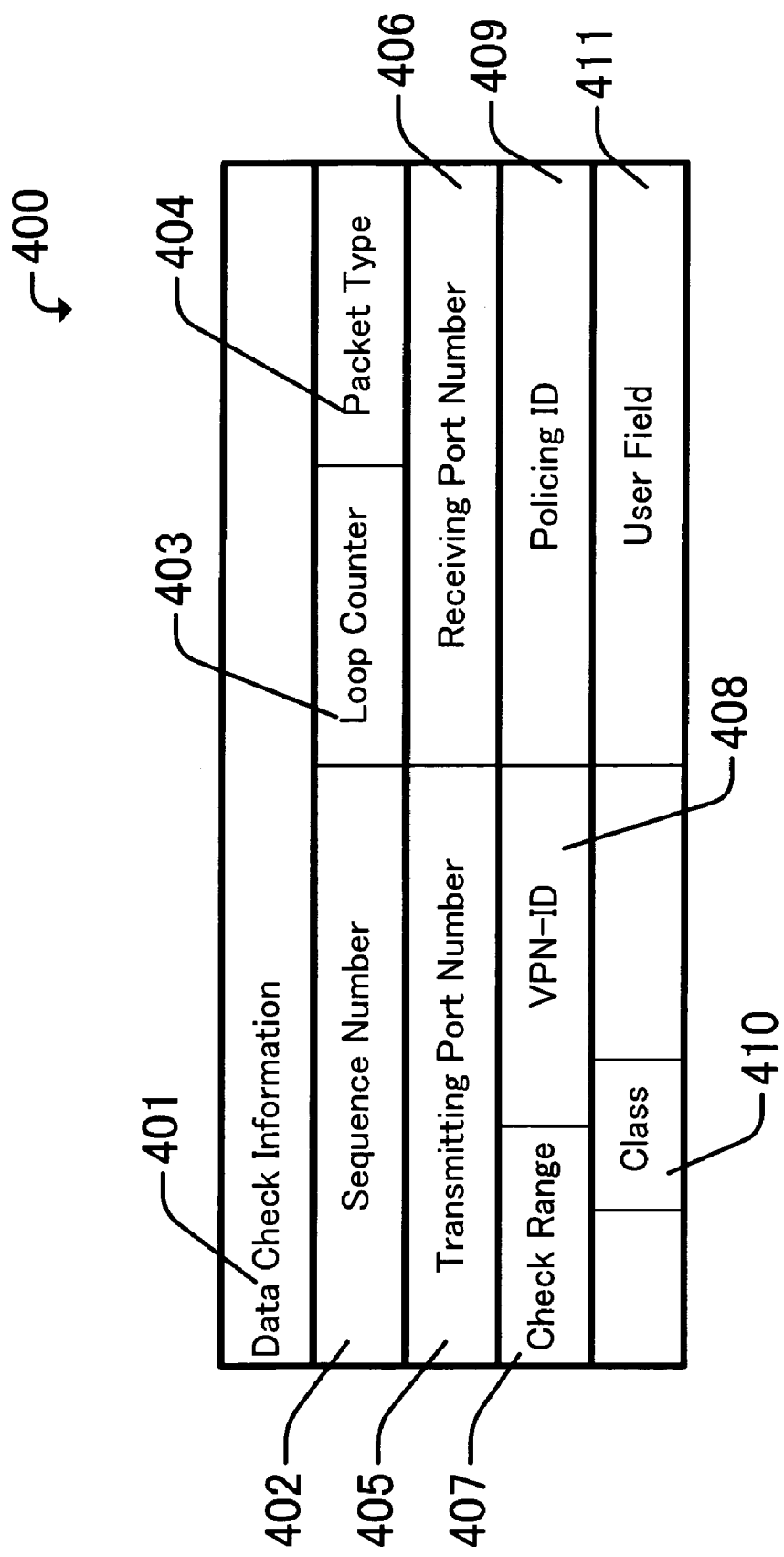
FIG. 12 illustrates an exemplary format of search result information which is stored in a device internal header.

Upon completion of the search processing, the search engine 30 stores search result information including the result of the search processing into a device internal header, appends the device internal header to the packet to build a search result block, and then transmits the search request block to the packet processing engine 20 via the communication link 6. The above-mentioned search result information can be configured, for example, as shown in FIG. 12 which will be described later.

The packet processing engine 20 processes the packet included in the search result block transmitted from the search engine 30, and delivers the search result block to the traffic manager 40 via the communication link 3.

The traffic manager 40 performs traffic control on the packet delivered from the packet processing engine 20 on the basis of the search result information stored in the device internal header of the search result block, and delivers the search result block to the output interface 50 via the communication link 4.

The output interface 50 transmits the packet stored in the search result block to the one or more transmitting ports 5, which are, for example, connected to the primary line, on the basis of the search result information stored in the search result block. For example, the output interface 50 transmits the packet to one of the one or more transmitting ports 5 which corresponds to a transmitting port number set in the search result information.

In the packet processing apparatus mentioned above, the packet processing engine 20, for example, can be configured to includes a data-flow-type network processors, and the communication link 6 can be configured to be included in a bus having a bandwidth which is equal to or greater than a total transmission bandwidth of one or more receiving ports which are, for example, connected to a primary line, thereby allowing search request/result blocks, which includes a packet received from the receiving ports 1 and a device internal header appended by the packet processing engine 20, to be transmitted between the packet processing engine 20 and the search engine 30 without stalling a packet flow in the primary line.

Moreover, the packet processing engine 20 is simplified by providing the search engine 30 and the traffic manager 40 with a packet buffer 39 and 49 respectively, resulting in reduction in its processing load.

Figure 2:
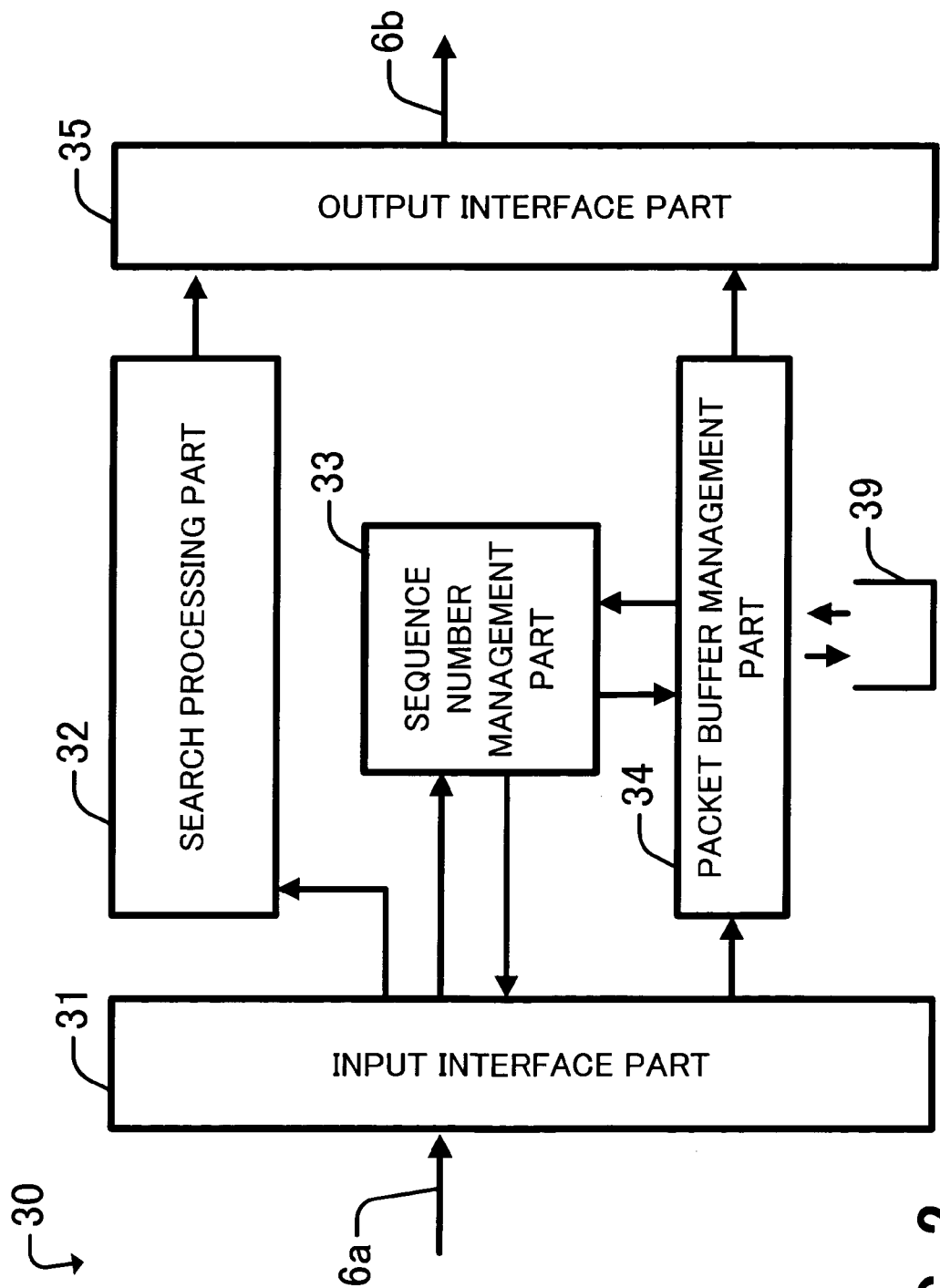
FIG. 2 is an exemplary block diagram illustrating a search engine according to the first embodiment of the present invention.

FIG. 2 is an exemplary block diagram illustrating a search engine according to the first embodiment of the present invention.

The search engine 30 includes an input interface 31, a search processing part 32, a sequence number management part 33, a packet buffer management part 34, a packet buffer 39, and an output interface 35. 6a and 6b are an input port and an output port respectively, which are connected to the communication link 6 shown in FIG. 1.

The input interface 31 notify the sequence number management part 33 of packet-receiving notification upon receiving a search request block (including a device internal header and a packet) from the packet processing engine 20 via the input port 6a, where the search request block can be formed, for example, as shown in FIG. 9 which will be described later.

The sequence number management part 33 constantly holds a next sequence number which is to be assigned to a packet next received from the packet processing engine 20.

Upon receiving the packet-receiving notification from the input interface part 31, the sequence number management part 33 reads out the next sequence number held therein and notifies the next sequence number to the input interface 31, and updates the next sequence number.

Figure 11:
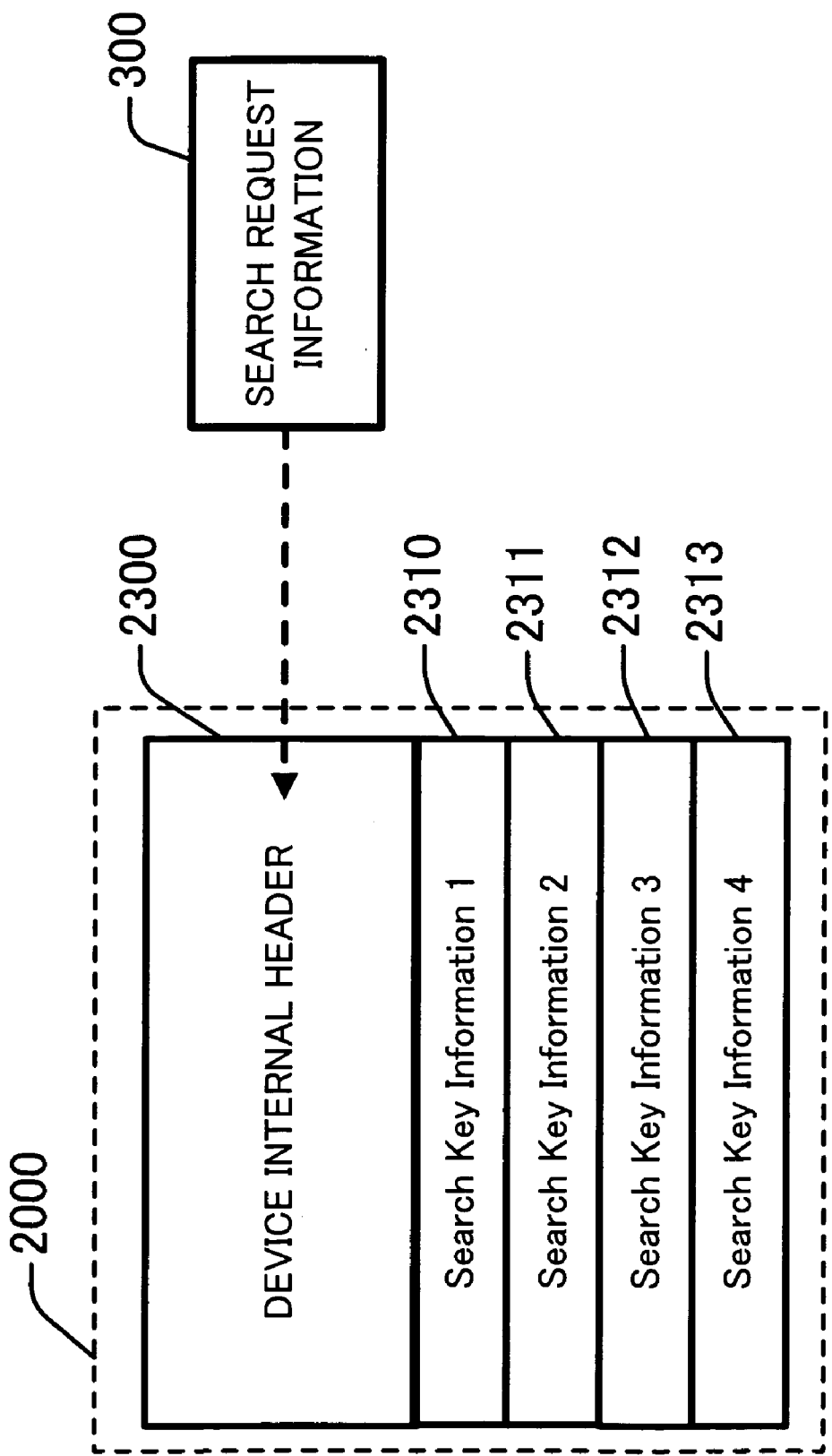
FIG. 11 illustrates an exemplary format of a search processing request data used by a search processing part of a search engine.

The input interface 31 sets the sequence number notified by the sequence number management part 33, at the search request information which was extracted from the device internal header of the search request block received, and builds a search processing request data which includes the search request information having the sequence number notified and search key information. The search processing request data, for example, can be configured as shown in FIG. 11, where the search key information is extracted from a portion of the packet which is pointed by a search key pointer stored in the search request information (for example, see FIG. 10). The search processing request data built is delivered to the search processing part 32. The delivery of search processing request data to the search processing part 32 can be done, for example, through a queuing method such as a FIFO (First In First Out) method.

The input interface 31 delivers the received packet to the packet buffer management part 34 along with the sequence number notified by the sequence number management part 33.

The packet buffer management part 34 stores the packet delivered from the input interface part 31 into the packet buffer 39, and holds a location (for example, address information) and length of the packet in association with the sequence number.

The search processing part 32 performs search processing in which the search key information contained in the search processing request data is used, and notifies search result information including a result of the search processing to the output interface part 35 in association with the sequence number. Search result information mentioned above can be formed, for example, as shown in FIG. 12.

Upon receiving a search result information from the search processing part 32, the output interface part 35 reads out the packet corresponding to the sequence number through the packet buffer management part 34, builds a search result block which contains the packet and the search result information received from the search processing part 32, and transmits the search result block to the packet processing engine 20 via the output port 6b connected to the communication link 6.

In this case, as mentioned above, the search engine 30 can maintain a transmission order of packets since the packets are processed serially in order of arrival on the basis of the sequence number assigned to the packets.

The packet processing engine 20 performs packet processing on the packet transmitted from the search engine 30, on the basis of the search result information included in the search result block, and sends the search result block containing the packet processed by the packet processing engine 20 to the traffic manager 40. The traffic manager 40 stores the search result block in the packet buffer 49, performs traffic control on the packet on the basis of the search result information included in the search result block, and sends the search result block to the output interface 50. The output interface 50 transmits the packet included in the search result block to the transmitting ports 5 on the basis of the search result information included in the search result block.

As mentioned above, packet processing on the packet is performed twice by the packet processing engine 20: when the packet is received from the input interface 10 via the communication link 2 and when the packet is received from the search engine 30 via the communication link 6. This allows the packet processing engine 20 to divide the packet processing into two processes and stepwise perform the packet processing in two steps.

Figure 3:
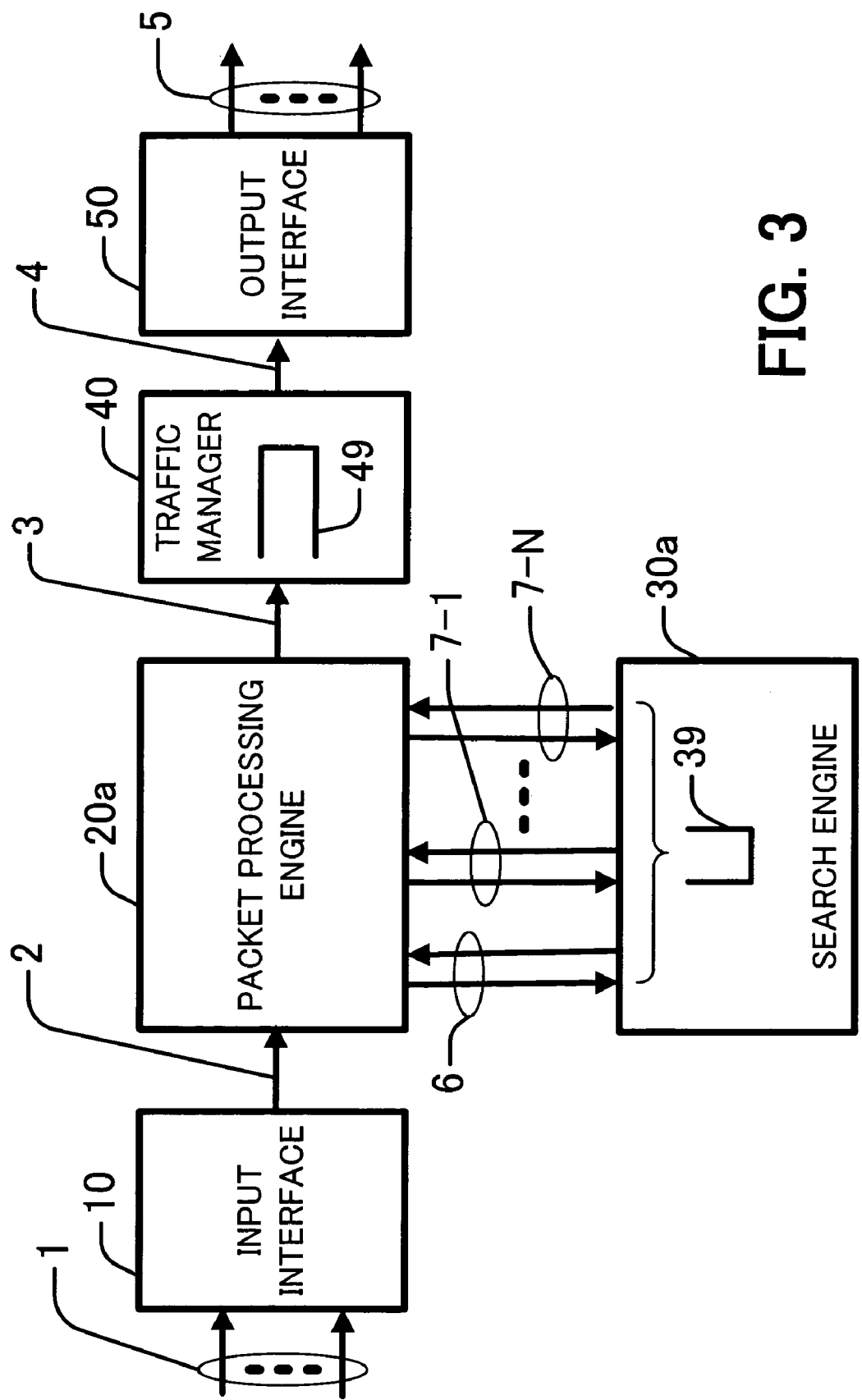
FIG. 3 is an exemplary block diagram illustrating a packet processing apparatus according to a second embodiment of the present invention.

FIG. 3 is an exemplary block diagram illustrating a packet processing apparatus according to a second embodiment of the present invention.

According to the second embodiment of the present invention, in addition to the communication link 6, which is hereinafter described as a first communication link, between a packet processing engine 20 and a search engine 30, one or more second communication links are provided. For example, N (natural number) pairs of two-way communication links are provided as the second communication links. The N pairs of communication links allow efficient packet loop processing which stepwise processes a packet in multiple steps by repeatedly transferring the packet between the packet processing engine 20a and the search engine 30a. That is, maximum N times of packet loop processing on a packet can be performed, and maximum N packets can concurrently undergo loop processing, by corresponding each of the second communication links to times loop processing on the packet is being executed, i.e., a current loop count of the packet in loop processing, and executing loop processing on the packet via one of the second communication links corresponding to the current loop count of the packet in loop processing.

For example, the packet processing engine 20a sends a packet received from the input interface 10 to the search engine 30a via the first communication link. The search engine 30a performs search processing on the packet received, and transmits the packet along with a device internal header (storing search result information) to the packet processing engine 20*a* via one of the second communication links. Upon receiving the packet along with the device internal header from the search engine 30*a*, the packet processing engine 20*a* performs additional processing on the packet, and sends the packet along with a device internal header to the search engine 30*a* via one of the second communication links. The search engine 30*a* performs additional processing on the packet received on the basis of the search request information stored in the device internal header. If further loop processing is needed, the search engine 30*a* send the packet to the packet processing engine 20*a* along with search result information indicating that loop processing is needed.

In this way, loop processing, which stepwise performs additional process on the packet by repeatedly transferring the packet between the packet processing engine 20 and the search engine 30 via the second communication links, is executed. In this case, the packet is transferred between the packet processing engine 20*a* and the search engine 30*a* via one of the second communication links corresponding to the current loop count of the packet in loop processing, allowing the packet to undergo maximum N times of loop processing. Upon completion of the loop processing, the search engine 30*a* builds a final search result block which contains the packet and the device internal header storing the final search result information obtained from the loop processing, and transmits the final search result block to the packet processing engine 20*a* via the first communication link.

As mentioned above, search processing in the search engine 30*a* and packet processing in the packet processing engine 20*a* can be performed multiple times on the packet which has been received from the receiving ports 1, allowing the packet to undergo processing with increased complexity. In order to perform loop processing described above, the device internal header can include a loop counter which indicates a current loop count of the packet in loop processing, i.e., times loop processing is being performed, as described in FIGS. 10 and 12.

With this arrangement, in which each of the maximum N second communication links corresponds to a current loop count of a packet in loop processing, loop processing on maximum N packets can be performed concurrently by transmitting each of the packets via the different communication link corresponding to the current loop count of the packet in loop processing.

The packet on which the loop processing has been completed as mentioned above is delivered from the packet processing engine 20*a* to the traffic manager 40 along with a device internal header. The traffic manager 40 temporally stores the packet in the packet buffer 49, and delivers the packet to the output interface 50 along with the device internal header. The output interface 50 transmits the packet to the transmitting ports 5 on the basis of the search result information stored in the device internal header.

With the arrangement described above, the packet processing engine 20*a* is allowed to stepwise process a packet multiple times. Consequently, expansion of functions can readily be achieved even when the packet processing engine 20*a* has sufficient transmission speed but has limited processing capability, for example, in the case of data-flow-type processor.

Figure 4:
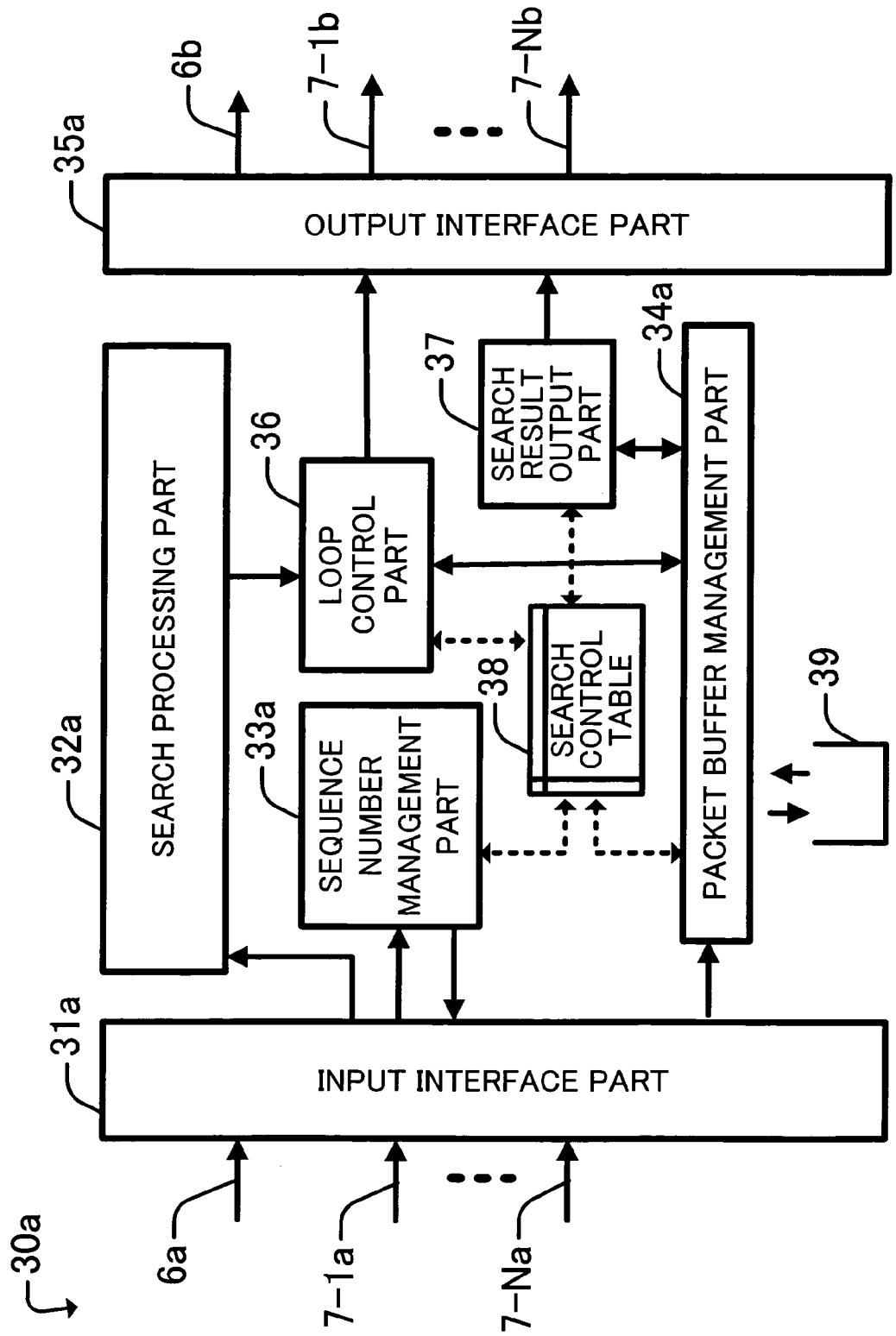
FIG. 4 is an exemplary block diagram illustrating a search engine according to the second embodiment of the present invention.

FIG. 4 is an exemplary block diagram illustrating a search engine according to the second embodiment of the present invention.

The search engine 30*a* includes an input interface part 31*a*, a search processing part 32*a*, sequence number management part 33*a*, a packet buffer management part 34*a*, an output interface part 35*a*, and a packet buffer 39. According to the second embodiment of the present invention, the search engine 30*a* further includes a loop control part 36, a search result output part 37, and a search control table 38. 6*a* and 6*b* are respectively an input port and an output port of the search engine 30*a* which are connected to the communication link 6 shown in FIG. 3. 7-1*a*, . . . , 7-N*a* are input ports of the search engine 30*a* which are respectively connected to the second communication links 7-1, . . . , 7-N described in FIG. 3. 7-1*b*, . . . , 7-N*b* are output ports of the search engine 30*a* which are connected to communication links 7-1, . . . , 7-N shown in FIG. 3.

According to the second embodiment of the present invention, packet loop processing, which stepwise executes additional processing on a packet in the packet processing engine 20*a* and the search engine 30*a*, is executed by performing up to N times of iterative transfers of the packet between the packet processing engine 20*a* and the search engine 30*a*. The packet on which packet loop processing has completed is stored in the packet buffer 39, and a final search result obtained when entire loop processing has completed is stored in the search control table 38 by the loop control part 36.

The packet stored in the packet buffer 39 and the final search result stored in the search control table 38 are extracted in ascending order of first received times of packets, i.e. received times of packets before loop processing on the packet begins, by the search result output part 37, and transmitted to the packet processing engine 20*a*. This allows the packet processing engine 20*a* to deliver the packet received from the input interface 10 to the traffic manager 40, in order of arrival from the input interface 10.

To maintain the order of packet transfer as mentioned above, a search request block sent from the packet processing engine 20*a* to the search engine 30*a* can include information identifying whether a packet included in a search request block is an initial packet before loop processing begins or a packet in loop processing.

For example, sequence number information can be included in a device internal header of a search request block and set at 0 in the case of an initial packet. The search engine 30*a* can be configured to assign sequence numbers except 0 to packets. Upon receiving a search request block including a sequence number of 0 in the device internal header (search request information), the search engine 30*a* sequentially assign a new sequence number except 0 and stores the received time of the search request block into the search control table 38 in association with the assigned sequence number.

The assigned sequence number is set in search result information (for example, see FIG. 12) which is stored in the device internal header of a search result block to be transmitted to the packet processing engine 20*a*.

In the case of loop processing, the packet processing engine 20*a* send a search request block having a device internal header including the sequence number which has been transmitted from the search engine 30*a*. That is, the sequence number assigned to a packet by the search engine 30*a* is held in the device internal header during loop processing on the packet. This allows the search engine 30*a* to determine that the received search request block is for an initial packet before loop processing when 0 is set in the sequence number included in the device internal header, and to determine that the received search request block is for loop processing when a sequence number not equal to 0 is set in the sequence number included in the device internal header.

Furthermore, since final search result information of packets on which loop processing has completed is stored in the search control table 38 in association with sequence numbers, the search engine 30*a* can transmit the packets on which loop processing has completed to the packet processing engine 20a in ascending order of first received times of the packets before loop processing, by transmitting the packets on which loop processing has completed in ascending order of sequence numbers assigned to the packets.

The input interface part 31a receives a search request block (including a device internal header and a packet) from the packet processing engine 20a via the input port 6a (connected to the first communication link) or via the input ports 7-1a, ..., 7-Na (connected to the second communication links). The device internal header stores search request information provided by the packet processing engine 20a. For example, when a sequence number included in the search request information is set at 0, the interface part 31a notifies reception of an initial packet to the sequence number management part 33a. The sequence number management part 33a assigns a new sequence number to the initial packet notified by the input interface part 31a, and notifies the assigned sequence number to the input interface part 31a. At the same time, the sequence number management part 33a stores the received time of the initial packet into a search control record (described later) in the search control table 38 in association with the assigned sequence number, and initializes the search control record (for example, resetting an in-process flag etc.).

The input interface part 31a sends the received initial packet to the packet buffer management part 34a along with the assigned sequence number. The packet buffer management part 34a stores the initial packet sent from the input interface part 31a into the packet buffer 39. At this time, information necessary for writing and reading of the packet in the packet buffer 39, such as address and packet length, is stored in the search control table 38 in association with the sequence number. The sequence number remains associated with the packet until all search processing operations are completed. For search processing performed for the second time or later, the packet is managed on the basis of the sequence number assigned in this first-time search processing.

Next, the input interface part 31a extracts the search request information from the device internal header of the search request block received from the packet processing engine 20a, and sets the sequence number assigned by the sequence management part 33a in the search request information extracted, where, for example, search request information can be built as shown in FIG. 10.

The input interface part 31a also extracts search key information from a portion of the packet which is pointed by a search key pointer of the search request information, builds search processing request data, which is, for example, configured to include the search request information and the search key information as shown in FIG. 11, and sends the search processing request data to the search processing part 32a. In this case, search processing request data also can be configured to be delivered to the search processing part 32a using a queuing method such as FIFO (first-in, first-out) method.

The search processing part 32a performs search processing on the basis of the search processing request data delivered from the input interface part 31a. Upon completion of search processing, the search processing part 32a delivers search result information and loop-determining information indicating whether loop processing is needed or not, to the loop control part 36.

The loop control part 36 checks the loop-determining information delivered from the search processing part 32a.

When determining that loop processing is needed, the loop control part 36 reads out the corresponding packet from the packet buffer 39 through the packet buffer management part 34a, increments loop counter in the search result information, builds a search result block (including a device internal header storing the search result information and the packet), and sends the search result block to the output interface part 35a. The output interface part 35a transmits the search result block delivered from the loop control part 36 to the packet processing engine 20a, via an output port connected to one of the second communication links (one of output ports 7-1b, ..., 7-Nb) corresponding to the loop counter value in the search result information. For example, if the loop counter is set at 3, the search result block is transmitted to the packet processing engine 20a via the output port 7-3b.

When determining that loop processing is not needed, the loop control part 36 resets a loop counter (for example, setting the loop counter at 0) in the search result information delivered from the search processing part 32a, and stores the search result information in the search control table 38 in association with the sequence number.

The search control table 38 includes search control records for managing information relating to packets in loop processing in association with sequence numbers, a current timer for holding current time information, and a waiting time indicating the allowable maximum processing time for loop processing on a packet. Details of the search control table 38 will be described later with reference to FIG. 5.

The search result output part 37, which is invoked at intervals of a predetermined time, sends the packets that have undergone all the necessary loop processing to the packet processing part 20a in ascending order of first received times of the packets, i.e., received times of the packets before loop processing. The search result output part 37 searches the search control records stored in the search control table 38 for the search control record which is in loop processing and has the oldest first received time of the packet, determines whether the waiting time has expired from the oldest first received time.

When the waiting time has elapsed, the search result output part 37 checks status information included in the search control record, and if the status information indicates that all the search processing has completed, the search result output part 37 extracts the packet from the packet buffer 39 through the packet buffer management part 34a, builds a search result block (including the packet and a device internal header storing the final search result information), and sends the search result block to the output interface part 35a. The output interface part 35a checks the loop counter included in the search result information stored in the search result block. In this case, since the loop counter is reset (for example, set at 0), the output interface part 35a determines that the search result information is final, and transmits the search result block to the packet processing engine 20a via an output port 6b connected to the first communication link.

When the waiting time has elapsed but the status information indicates that all the search processing has not completed yet, the search result output part 37 discards the packet through the packet buffer management part 34a, and terminates the loop processing on the packet.

Figure 5:
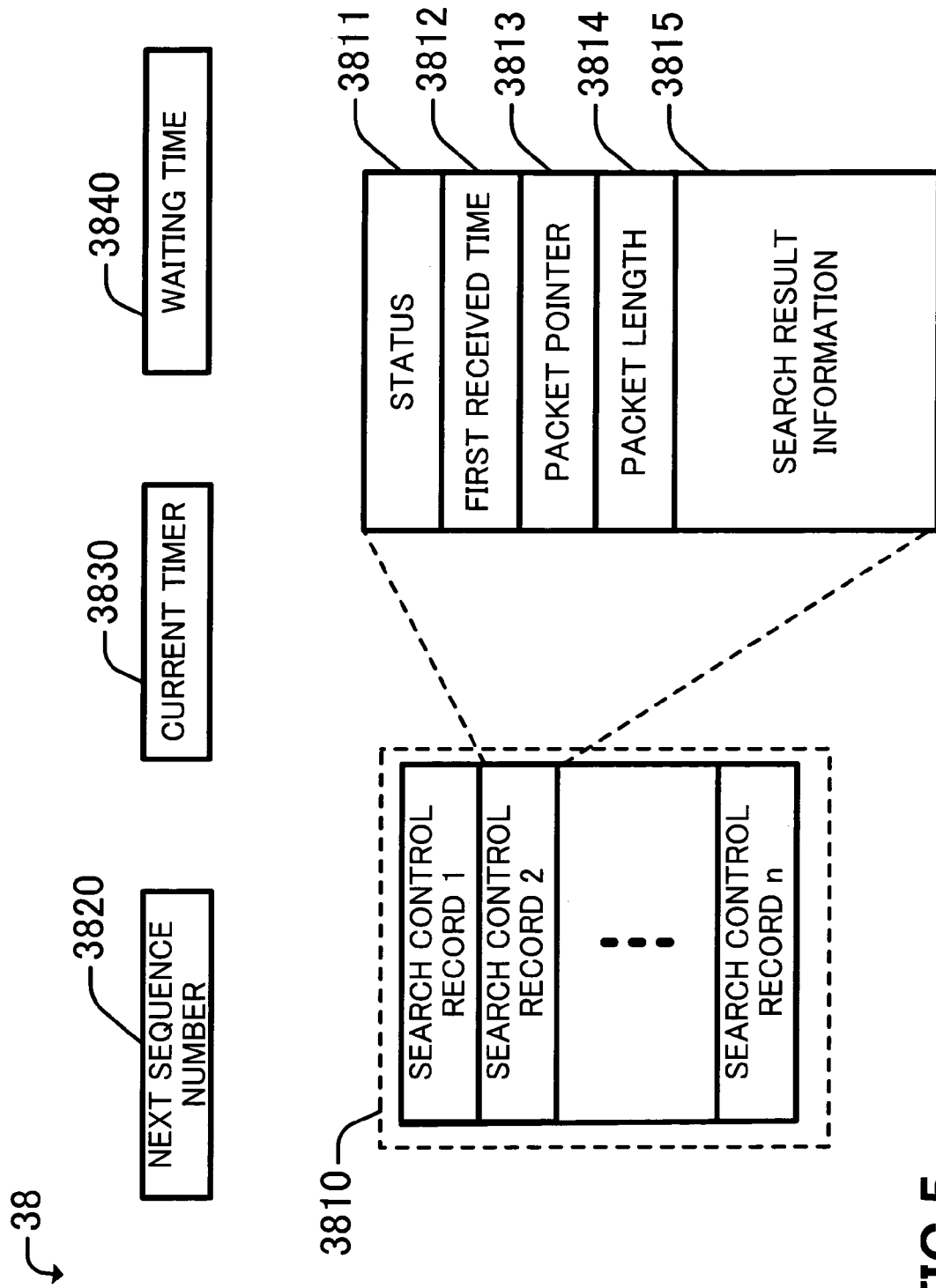
FIG. 5 illustrates an exemplary configuration of a search control table of a search engine according to the second embodiment of the present invention.

FIG. 5 illustrates an exemplary configuration of a search control table of a search engine according to the second embodiment of the present invention.

The search control table 38 includes a search control record storing part 3810 storing search control records each associated with a sequence number assigned by the sequence number management part 33*a*, a next sequence number 3820, a current timer 3830, and a waiting time 3840.

The next sequence number 3820 stores a sequence number which will be next assigned to an initial packet received from the packet processing engine 20*a*, where an initial packet means a packet received at the first time from the packet processing engine 20*a* before loop processing on the packet begins.

The packet processing engine 20*a* can be configured to set at 0 a sequence number of search request information in a search request block when sending an initial packet to the search engine 30*a*, allowing the search engine 30*a* to distinguish an initial packet from other packets by using values other than 0 as sequence numbers assigned to packets.

For example, sequence numbers can be configured to use natural numbers between 1 and n (n is a predetermined natural number) in cyclic ascending order. In this case, the next sequence number 3820 is incremented by 1 each time a new sequence number is assigned to an initial packet received from the packet processing engine 20*a*, and set at 1 when the next sequence number 3820 exceeds n. For example, natural numbers (1, 2, . . . , n, 1, 2, . . . , n, 1, . . . are assigned as sequence numbers respectively. It is preferable that the predetermined natural number n is a natural number equal to or greater than N+1 where N is the number of the second communication links. This is because the maximum number of packets processed concurrently by the search engine 30*a* may be equal to or greater than N+1. N packets may be loop processed concurrently via N communication links of the second communication links, and 1 packet may be processed without loop processing via the first communication link at the same time, meaning that maximum N+1 of packets may be processed concurrently in the search engine 30*a*. Moreover, some packets may be accumulated in the search engine 30*a* due to delay in internal processing of the search engine 30*a*, and more than N+1 of packets may be processed concurrently in the search engine 30*a*.

The current timer 3830 is a timer holding the current time, and can be, for example, configured to be count up at intervals of a predetermined time by another process not described in FIG. 5.

The search control record storing part 3810 is a storage area holding search control records for managing in-process packets in association with sequence numbers.

A search control record, for example, can be configured to include status information 3811 indicating status concerning search processing on the packet, an first received time 3812 meaning a first received time of a packet before loop processing, a packet pointer 3813 indicating a location in the packet buffer 39 at which the packet is stored, packet length 3814, and search result information 3815 storing a final search result information of search processing on the packet.

The status information 3811 includes an in-process flag indicating whether search processing on the packet is active or not, and a search completion flag indicating whether all search processing (including all the loop processing) on the packet has completed or not. The search result output part 37 shown in FIG. 4 sends a final search result block (including the packet and a final search result information) to the packet processing engine 20*a* by determining whether all search processing has completed or not, with reference to the search completion flag (for example, ON in the case of completion of all search processing). When an initial packet is received and a new sequence number is assigned to the initial packet, the status information 3810 is initialized, i.e., the in-process flag and the search completion flag are reset (for example, set at OFF).

The first received time 3812 indicates a time at which the search engine 30*a* received a search request block including an initial packet for the first time before loop processing on the packet begins.

The packet pointer 3813 indicates a position in the packet buffer 39 at which the packet in process is stored.

The packet length 3814 indicates length of the packet in process.

The search result information 3815 holds final search result information concerning the packet on which all search processing has completed.

The search control record storing part 3810 can be configured to include n search control records as shown in FIG. 5, by corresponding sequence numbers (1, 2, . . . , n) to search control records (search control record 1, 2, . . . n) respectively.

In this case, the search control table 38 can be configured to hold the sequence number corresponding to the search control record having the oldest first received time in a predetermined storage area so as to directly read out the search control record having the oldest first received time on the basis of the predetermined storage area.

The search control 38 is described below with reference to the exemplary block diagram of a search engine 30*a* shown in FIG. 4.

The sequence number management part 33*a* reads a sequence number from the next sequence number 3820 and notifies the sequence number to the input interface part 31*a*. At the same time, the sequence number management part 33*a* initializes the search control record corresponding to the sequence number, sets the first received time 3812 at the received time of the initial packet received, and increments the next sequence number 3820 by 1 using natural numbers from 1 to n cyclically.

The packet buffer management part 34*a* stores the packet delivered from the input interface part 31*a* along with the sequence number into the packet buffer 39, stores the location information at which the initial packet was stored into the packet pointer 3813, and stores the length of the initial packet into the packet length 3814.

The search processing part 32*a* executes search processing on the basis of search processing request data (including search key information), determines whether or not to execute loop processing, and delivers loop-determining information (indicating whether the loop processing is needed or not) to the loop control part 36 along with search result information.

When the loop-determining information indicates that loop processing is not needed, i.e., all loop processing have completed, the loop control part 36 resets the loop counter of the search result information, stores the search result information into the search result information 3815 of the search control record corresponding to the sequence number, and set a search completion flag of the status information 3811 at ON.

When the loop-determining information indicates that loop processing is needed, the loop control part 36 increments the loop counter in the search result information, reads out the corresponding packet from packet buffer 39 through the packet buffer management part 34*a*, builds a search result block (including the packet and a device internal header storing the search result information), and delivers the search result block to the output interface part 35*a*. The output interface part 35*a* transmits the search result block, which contains the search result information in loop processing, to the packet processing engine 20*a* via one of the second communication links corresponding to the loop counter value included in the search result information.

The search result output part 37, which is invoked at intervals of a predetermined time, extracts the first search control record having the status information 3811 with the in-processing flag ON by searching search control records, starting from the search control record corresponding to the next sequence number 3810, in cyclic ascending order of search control record numbers, where a search control record number one-to-one corresponds to a sequence number.

The search result output part 37 subtracts the time indicated by the first received time 3812 of the search control record extracted above from the time indicated by the current timer 3830 to obtain a time difference, and determines whether the time difference exceeds the time indicated by the waiting time 3840 or not.

When the time difference exceeds the time indicated by the waiting time 3840, the search result output part 37 further determines whether a search completion flag of the status information 3811 is set at ON or not.

When the search completion flag is ON, the search result output part 37 reads out the search result information 3815, stores the search result information in a device internal header, and extracts the packet from the packet buffer 39 through the packet buffer management part 34a. At the same time, the search result output part 37 resets the in-processing flag of the status information 3811 (for example, sets the in-processing flag at OFF), and discards the packet stored in the packet buffer 39. Then, the search result output part 37 builds a search result block including the device internal header and the packet, and delivers the search result block to the output interface part 35a as a final search result block. The output interface part 35a transmits the final search result block to the packet processing engine 20a via the output port 6b connected to the first communication link.

When the search completion flag is OFF, meaning that the search processing has not completed within the predetermined waiting time, the search result output part 37 resets the in-processing flag of the status information 3811, discards the packet stored in the packet buffer 39, and terminates processing on the packet.

As mentioned above, the search engine 30a holds a packet and search result information in association with a sequence number, from the first received time of the packet to the time of completion of all search processing (including loop processing) on the packet.

When a predetermined waiting time has elapsed and search processing on the packet having the oldest first received time has completed, the search engine 30a extract the packet from the packet buffer 39, and transmits the packet to the packet processing engine 20a.

When a predetermined waiting time has elapsed and search processing on the packet having the oldest first received time has not completed, the search engine 30a discards the packet and terminates the search process on the packet. This allows the search engine 30a to execute loop processing of multiple packets concurrently and efficiently, and to transmit packets on which search processing has completed to the packet processing engine 20a, with maintaining the transferring order of packets received from the packet processing engine 20a.

Figure 6:
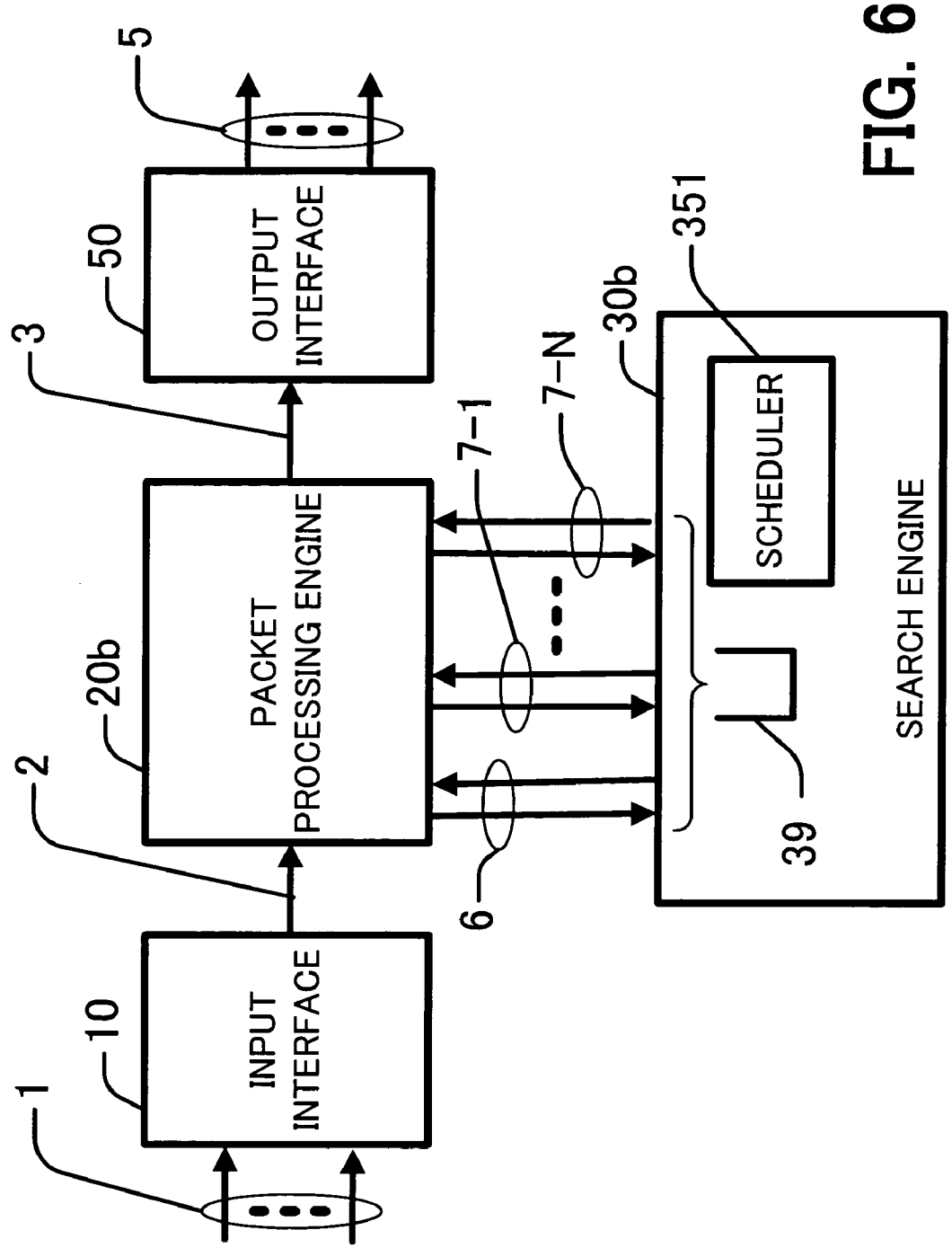
FIG. 6 is an exemplary block diagram illustrating a packet processing apparatus according to a third embodiment of the present invention.

FIG. 6 is an exemplary block diagram illustrating a packet processing apparatus according to a third embodiment of the present invention.

The packet processing apparatus according to the third embodiment includes an input interface 10, a packet processing engine 20b, a search engine 30b, an output interface 50, the packet buffer 39, and a scheduler 351. The packer processing engine 20b and the search engine 30b are communicably linked through a first communication link 6 and second communication links 7-1, 7-2, . . . , 7-N in the same way as the second embodiment of the present invention.

The packet processing engine 20b has features similar to those of the search processing engine 20a shown in FIG. 3 except that the packet processing engine 20b directly delivers data to the output interface 50.

The packet processing engine 20b, similarly to the second embodiment, appends a device internal header to a packet fed from the input interface 10 and then transfers the packet to the search engine 30b. The search engine 30b temporarily stores the transferred packets in the packet buffer 39, performs search operation on the basis of search keys contained in the device internal headers, and then sends search result information and the packet to the packet processing engine 20b. The packet processing engine 20b and the search engine 30b can perform loop processing on the packet in the same way as the second embodiment of the present invention.

According to the third embodiment, the search engine 30b further includes the scheduler 351 which serves to perform processing similar to that performed by a traffic manager 40 shown in FIGS. 1 and 3. Since the third embodiment includes all the features of the second embodiment, details for the features of the second embodiment are omitted here.

According to the third embodiment, the search engine 30b transmits the packet on which all the loop processing has completed to the packet processing engine 20b through the scheduler 351. The scheduler 351 performs priority control such as queuing search result blocks (including the packet and the device internal header) on the basis of the search result information (for example, QoS control information) stored in the search control record. The search result blocks scheduled by the scheduler 351 are transmitted to the packet processing engine 20a via the first communication link 6.

The scheduler 351 can be configured to be included in the output interface part 35a shown in FIG. 4.

With the third embodiment, the packet buffer 39 is used for both search processing and scheduling for processed packets, which can simplify the configuration of the packet processing apparatus by eliminating the traffic manager 40 shown in FIG. 1 and FIG. 3.

Figure 7:
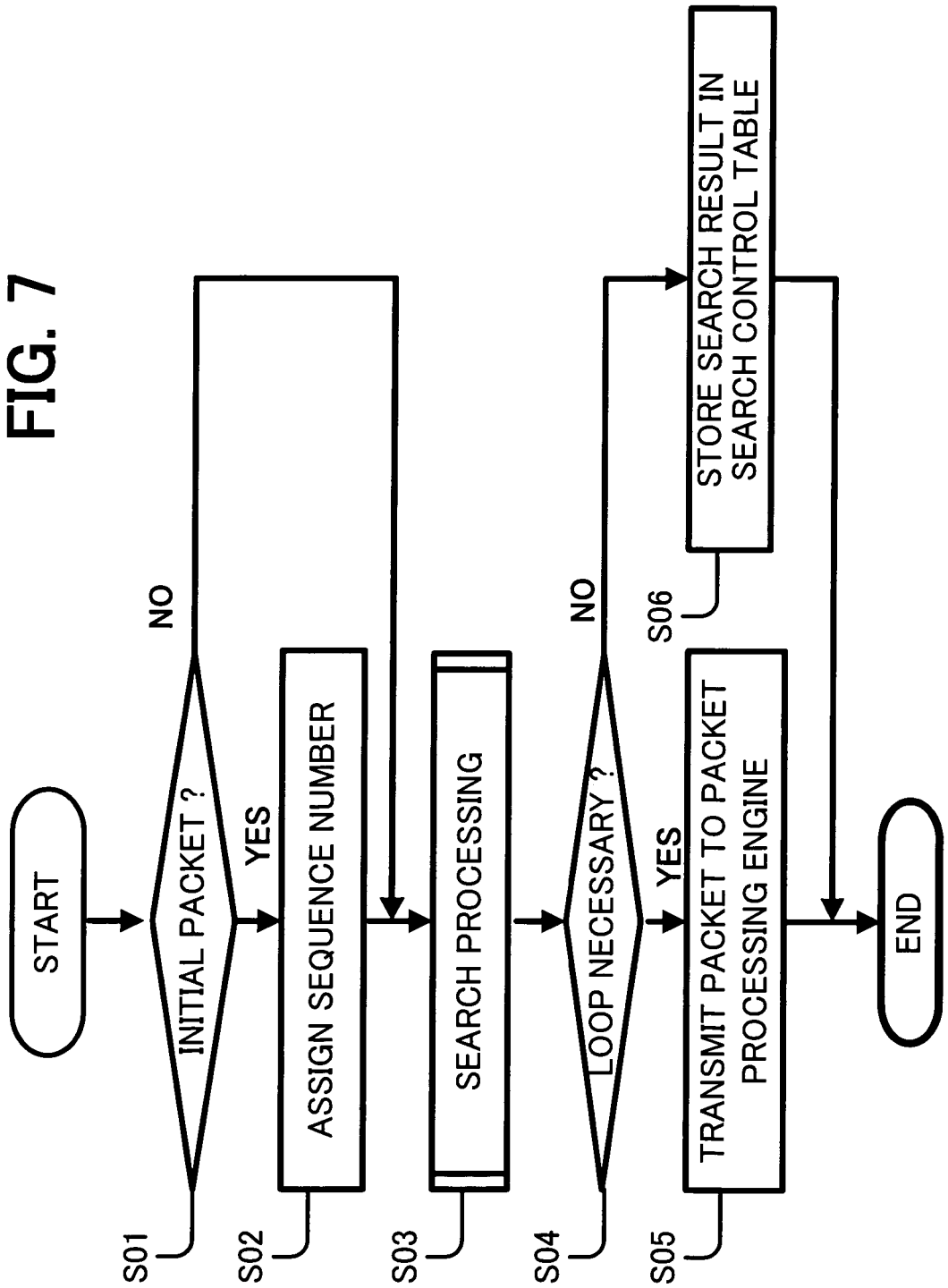
FIG. 7 is an exemplary flowchart illustrating a loop processing of a search engine according to the second embodiment of the present invention.

FIG. 7 is an exemplary flowchart illustrating a loop processing of the search engine according to the second embodiment of the present invention.

In step S01, upon receiving a search request block (including a device internal header and a packet), the search engine 30a determines whether the search request block is the first search request before loop processing or not on the basis of a search request information stored in the device internal header. The determination can be done on the basis of a sequence number set in the search request block. For example, the sequence number in the search request information can be set at 0 when the packet processing engine 20a transmits the packet to the search engine 30a for the first time before loop processing begins, and set at a natural number assigned to the packet when the packet is in loop processing. This allows the search engine 30a to determine that the received packet is an initial packet when the sequence number in the device internal header is 0 since sequence numbers assigned by the search engine 30a are natural numbers 1, 2, . . . , n.

In step S02, the search engine 30a assigns a sequence number extracted from the next sequence number 3820 to the packet received, updates the next sequence number 3820, and initializes the search control record in the search control table 38 corresponding to the assigned sequence number, and resets an in-processing flag and a search completion flag in the status information 3811.

In step S03, the search processing part 32a of the search engine 30a executes search processing, and delivers search result information indicating the result of the search processing and loop-determining information indicating whether loop processing on the packet is needed or not to the loop control part 36.

In step S04, the loop control part 36 determines whether loop processing is needed or nor on the basis of the loop-determining information. If loop processing is needed (if the determination is YES), the processing proceeds to step S05. If loop processing is not needed (if the determination is NO), the processing proceeds to step S06.

In step S05, the loop control part 36 increments by 1 the loop counter in the search result information delivered from the search processing part 32a, reads out the corresponding packet from the packet buffer 39, and builds a search result block including the packet and a device internal header storing the search result information. Then the search result block is transmitted to the packet processing engine 20a via one of the second communication links corresponding to the loop counter value, and the processing is terminated.

This allows packet loop processing which stepwise executes additional processing on a packet by transferring the packet in repeating fashion between the packet processing engine 20a and the search engine 30a. The packet loop processing can be executed maximum N times until the search processing part 32a determines that loop processing is not needed, where N is the number of the second communication links for loop processing between the packet processing engine 20a and the search engine 30a.

In step S06, the loop control part 36 sets the loop counter in the search result information at 0, stores the search result information into the search result information 3815 of the search control record, and terminates the processing.

The search result information stored in the search control record is extracted by the search result output part 37 which is invoked at intervals of a predetermined time, and stored in a device internal header which is transmitted to the packet processing engine 20a along with the packet via the first communication link. The flowchart of the search result output part 37 is described later with reference to FIG. 8.

Figure 8:
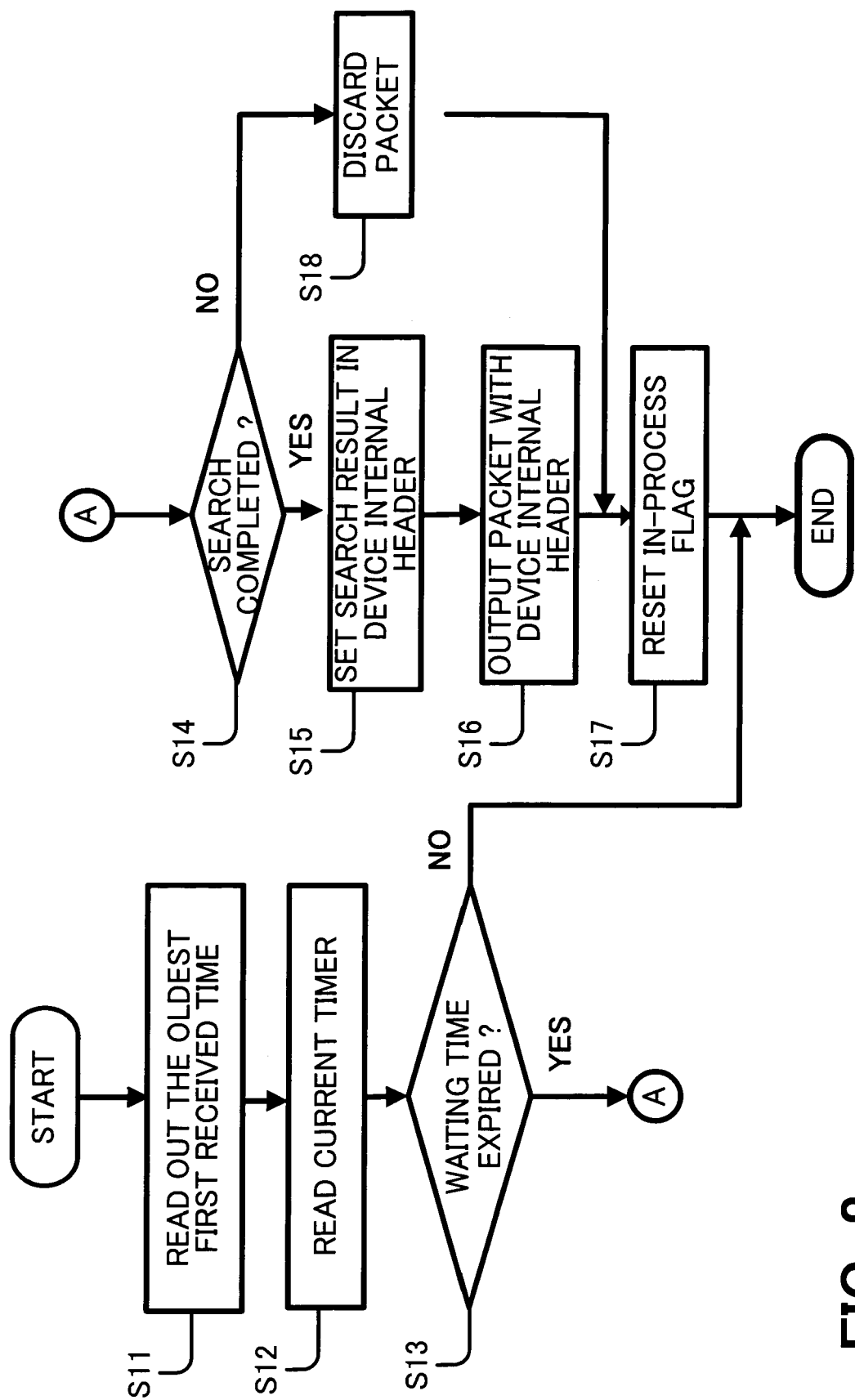
FIG. 8 is an exemplary flowchart illustrating a search result output processing of a search engine according to the second embodiment of the present invention.

FIG. 8 is an exemplary flowchart illustrating a search result output processing of the search engine 30a according to the second embodiment of the present invention.

More specifically, FIG. 8 shows the flowchart of the search result output part 37 in the search engine 30a shown in FIG. 4, which is invoked at intervals of a predetermined time. It is preferable that the predetermined time is as short as possible so as to decrease the number of packets accumulating in the search engine 30a.

In step S11, the search result output part 37 extracts, from the search control records, a search control record having the oldest first received time 3812 and the status information 3811 with the in-process flag ON, and read out the first received time 3812 from the search control record extracted. A packet pointed by the packet pointer 3813 of the search control record extracted above becomes the packet to be next transmitted to the packet processing engine 20a.

The search control record having the first received time 3812 of the oldest first received time can be obtained by the following method which utilizes the fact that sequence numbers 1, 2, . . . , n one-to-one correspond to search control record numbers 1, 2, . . . , n respectively.

The search engine 30a searches the search control records in cyclic ascending order of search control record numbers for the first search control record having the status information 3811 with an in-process flag ON, starting from the search control record corresponding to the next sequence number 3820, where "cyclic ascending order of search control record numbers" means, for example, the order of (1, 2, . . . , n, 1, 2, . . . , n, 1 . . . ).

The in-process flag of the status information 3811 is ON only during the time in which search processing is performed on the packet, and when a sequence number is assigned to the packet, the first received time of the packet is set in the first received time 3812 of the search control record corresponding to the assigned sequence number, where natural numbers (1, 2, . . . , n) are assigned as sequence numbers in cyclic ascending order, for example, in the order of (1, 2, . . . , n, 1, 2, . . . , n, 1, . . . ). Accordingly, the ascending order of the first received time 3812 of search control records having the status information 3811 with the in-process flag ON, agrees with the cyclic ascending order of sequence numbers (1, 2, . . . , n) corresponding to the search control records having the status information 3811 with the in-process flag ON.

Furthermore, the search engine 30a can holds the sequence number corresponding to the search control record having the first received time 3812 of the oldest first received time, allowing the search engine 30a to read out the oldest first received time directly from the first received time 3812 of the corresponding search control record without searching search control records.

In step S12, the search result output part 37 reads out the current time from the current timer 3830 in the search control table 38.

In step S13, the search result output part 37 subtracts the oldest first received time obtained in step S11 from the current time obtained in step S12 to obtain the time difference, and determines whether the time difference obtained is equal to or greater than the predetermined waiting time stored in the waiting time 3840.

If the time difference is equal to or greater than the predetermined waiting time (if the determination is YES), the processing proceeds to step S14.

If the time difference is less than the predetermined waiting time (if the determination is NO), the processing is terminated.

In step S14, the search result output part 37 determines whether search processing on the packet has completed or not on the basis of the search completion flag of the status information 3811.

If the search processing has completed (if determination is YES), the processing proceeds to step S15.

If the search processing has not completed yet (if determination is NO), the processing proceeds to step S18.

In step S15, the search result output part 37 reads out the search result information from the search result information 3815, and builds a device internal header including the search result information.

In step S16, the search result output part 37 read out the packet from the packet buffer 39, and builds a final search result block including the packet and the device internal header, and transmits the search result block to the packet processing engine 20a. At the same time, the packet held in the packet buffer 39 is deleted.

In step S17, the search result output part 37 resets the in-process flag of the status information 3811, and terminates the processing.

In step S18, the search result output part 37 discards the packet held in the packet buffer 39, and the processing proceeds to step S17.

FIG. 9 illustrates exemplary formats of a search request block and a search result block.

Although this configuration can be applied in the first, second, and third embodiment, for convenience of explanation, the case of the second embodiment is described here as a typical example.

The search request block is transferred from the packet processing engine 20*a* to the search engine 30*a*, and the search result block is transferred from the search engine 30*a* to the packet processing engine 20*a*, the traffic manager 40, and the output interface 50.

Each of the search request block and the search result block, for example, can be built in a data format 1000 shown in FIG. 9 which includes a device internal header 1100 and a packet area 1200.

In the case of the search request block, search request information 300 is stored in the device internal header by the packet processing engine 20*a*. In the case of the search result block, search result information 400 is stored in the device internal header by the search engine 30*a*.

The packet area 1200 stores a packet which is delivered from the input interface 10 to the packet processing engine 20*a*. In some case, the packet can be stored in the packet area 1200 after a part of the packet (for example, a header part) is modified by the packet processing engine 20*a*.

FIG. 10 illustrates an exemplary format of search request information which is stored in a device internal header.

Although this configuration can be applied in the first, second, and third embodiment, for convenience of explanation, the case of the second embodiment is described here as a typical example.

The search request information 300 is stored in the device internal header, and delivered from the packet processing engine 20*a* to the search engine 30*a*.

Data check information 301 stores data check information generated by the packet processing engine 20*a*. The packet processing engine 20*a* generates data check bits for the device internal header made by the packet processing engine 20*a* and for the data area of the packet which was modified by the packet processing engine 20*a*, and stores the generated data check bits into the data check information 301 of the search request information 300. For example, CRC (Cyclic Redundancy Check) can be employed as a data checking method. A data area on which data checking process was performed is indicated by a check range 305 described later.

A sequence number 302 stores a sequence number assigned by the search engine 30*a*. Since the same sequence number is held in the device internal header which is transferred between the search engine 30*a* and the packet processing engine 20*a* during loop processing, the packet in loop processing can be distinguished from other packets on the basis of the sequence number in the device internal header.

For an initial packet, which is sent from the packet processing engine 20*a* to the search engine 30*a* for the first time before loop processing on the packet begins, 0 can be set in the sequence number 302 of the search request information 300 to allow the search engine 30*a* to distinguish the initial packet from other packets in loop processing.

A loop counter 303 indicates times loop processing on the packet is being performed, i.e., a current loop count of the packet in loop processing. The packet processing engine 20*a* resets the loop counter 303 (for example, set at 0) for an initial packet, and stores the loop counter value which was set by the search engine 30*a* into the loop counter 303 while loop processing on the packet is being performed.

A packet type 304 indicates a packet type of the packet received from the receiving ports 1.

A check range 305 indicates a boundary position of a data area checked by the packet processing engine 20*a*.

For example, the check range 305 can be a relative address (an offset value) in the data format 1000 shown in FIG. 9. In this case, the area ranging from the top address in the data format 1000 to the relative address indicated by the check range 305, except the area of the data check information 301 in the search request information 300, can be checked. It is preferable to check the area ranging from the top address to the offset value because areas near the top address of the packet (for example, a header area) are often modified by the packet processing engine 20*a*.

With this arrangement, for example, when sending a search request block to the search engine 30*a*, the packet processing engine 20*a* calculates CRC bits for the data area modified by the packet processing engine 20*a*, stores the CRC bits calculated into the data check information 301, and stores the offset value indicating the last position of the modified area into the check range 305. Upon receiving the search request block, the search engine 30*a* calculates CRC bits for area ranging from top address of the search request block to the position indicated by the check range 305 except the area of the data check information 301, and compares the CRC bits calculated with the value set in the data check information 301 of the search request information 300 received from the packet processing engine 20*a*. If the calculated CRC bits agree with the value set in the data check information 301, the search engine 30*a* can determine that the portion modified by the packet processing engine 20*a* has been transferred with no errors. If the calculated CRC bits do not agree with the value set in the data check information 301, the search engine 30*a* can determine that errors occurred, and discard the search request block received.

In the same way, the search engine 30*a* can generate data check bits for a data area modified by the search engine 30*a*, and send the data check bits generated to the packet processing engine 20*a* along with a packet, as described later with reference to FIG. 12.

A VPN-ID (virtual Private Network-Identifier) 306 indicates ID information of VPN to which the packet received from the receiving ports 1 belongs.

A receiving port number 307 indicates a port number of the receiving ports 1 via which the packet was received.

Packet length 308 indicates the length of the packet.

A user field 309 indicates information which is, for example, used for expanding the features of the packet processing apparatus.

Search key pointers 310, 311, 312, 313 indicate the locations of areas where search key information is stored. Four search key pointers are described in FIG. 10, the number of search key pointers is not limited to this. When a size of search key information is small, the search key information can be stored in the search request information 300.

The search request information 300 described above is an example. Information items stored in the search request information 300 and the arrangement thereof may differ depending on the processing of the packet processing engine 20*a* and the search engine 30*a*. However, the present invention can be applied in that case.

FIG. 11 illustrates an exemplary format of a search processing request data used by a search processing part of a search engine.

Although this configuration can be applied to the first, second, and third embodiment, for convenience of explanation, the case of the second embodiment is described here as a typical example.

The input interface part 31*a* of the search engine 30*a* extracts search key information 1, 2, 3, 4 from the portions of packet area 1200 pointed respectively by the search key pointers 310, 311, 312, 313 in the search request information 300 which was sent from the packet processing engine 20a, builds a search processing request data 2000 storing a device internal header (including search request information) and search key information 2310, 2311, 2312, 2313, and delivers the search processing request data 2000 built to the search processing part 32a.

With this arrangement, the search processing part 32a can execute search processing effectively using the search key information delivered from the input interface part 31a.

For example, in the case of IPv4 packet data, IP-SA (IP source address), IP-DA (IP destination address), and specified data in the payload of the packet can be search key information.

Moreover, the search processing request data 2000 can be delivered to the search processing part 32a by a queuing method such as a FIFO method.

FIG. 12 illustrates an exemplary format of search result information which is stored in a device internal header.

Although this configuration can be applied in the first, second, and third embodiments, for convenience of explanation, the case of the second embodiment is described here as a typical example.

Data check information 401 stores data check information generated by the search engine 30a. The search engine 30a generates data check bits for the device internal header made by the search engine 30a and for the data area of the packet which was modified by the search engine 30a, and stores the generated data check bits into the data check information 401 of the search result information 400. For example, CRC (Cyclic Redundancy Check) can be employed as a data checking method. A data area on which data checking process is performed is indicated by a check range 407 described later.

A sequence number 402 stores a sequence number assigned by the search engine 30a. Since the same sequence number is held in the device internal header which is transferred between the search engine 30a and the packet processing engine 20a during loop processing, the packet in loop processing can be distinguished from other packets on the basis of the sequence number in the device internal header.

A loop counter 403 is a loop counter which is set by the search engine 30a and indicates a current loop count of the packet in loop processing. When determining that loop processing is needed, the search engine 30a increments the loop counter 403 by 1.

A packet type 404 stores a packet type of the packet to be processed.

A transmitting port number 405 indicates a port number of a port of transmitting ports 5 via which the packet is to be transmitted, for example, to the primary line.

A receiving port number 406 indicates a port number of a port of the receiving ports 1 via which the packet was received.

A check range 407 indicates the boundary position of a data area checked by the search engine 30a.

For example, the check range 407 can be a relative address (an offset value) in the data format 1000 shown in FIG. 9. In this case, the area ranging from the top address in the data format 1000 to the relative address indicated by the check range 407, except the area of the data check information 401 in the search result information 400, can be checked. It is preferable to check the area ranging from the top address to the offset value because areas near the top address of the packet (for example, a header area) are often modified by the search engine 30a.

With this arrangement, for example, when sending a search result block to the packet processing engine 20a, the search engine 30a calculates CRC bits for the data area modified by the search engine 30a, stores the CRC bits calculated into the data check information 401, and stores the offset value indicating the last position of the modified area into the check range 407. Upon receiving the search result block, the packet processing engine 20a calculates CRC bits for area ranging from top address of the search request block received to the position indicated by the check range 407 except the area of data check information 401, and compares the CRC bits calculated with the value set at the data check information 401 in the search result information 400. If the calculated CRC bits agree with the value set at the data check information 401, the packet processing engine 20a can determine that the portion modified by the search engine 30a has been transferred with no errors. If the calculated CRC bits do not agree with the value set at the data check information 401, the packet processing engine 20a can determine that errors occurred, and discard the search result block.

For the data portion not to be changed, it is not necessary to perform an error check in the packet processing engine 20a or the search engine 30a.

Moreover, in each processing part in the packet processing apparatus, it is configured such that parity is set, for example, when data is written to a RAM so that an error can be detected. This configuration enables packet transmission while maintaining high reliability.

A VPN-ID 408 indicates ID information of VPN to which the packet transmitted from the transmitting ports 5 belongs.

A policy ID 409 is ID information of a policy which is employed by the traffic manager 40 to perform QoS control such as priority control on the packet.

A class 410 indicates class information which is employed by the traffic manager 40 to perform QoS control such as priority control on the packet, in a similar way as the policy ID 409 mentioned above.

A user field 411 indicates information which is, for example, used for expanding the features of the packet processing apparatus.

The search result information 400 described above is an example. Information items stored in the search result information 400 and the arrangement thereof may differ depending on the processing of the packet processing engine 20a and the search engine 30a. However, the present invention is also applied in that case.

Figure 13:
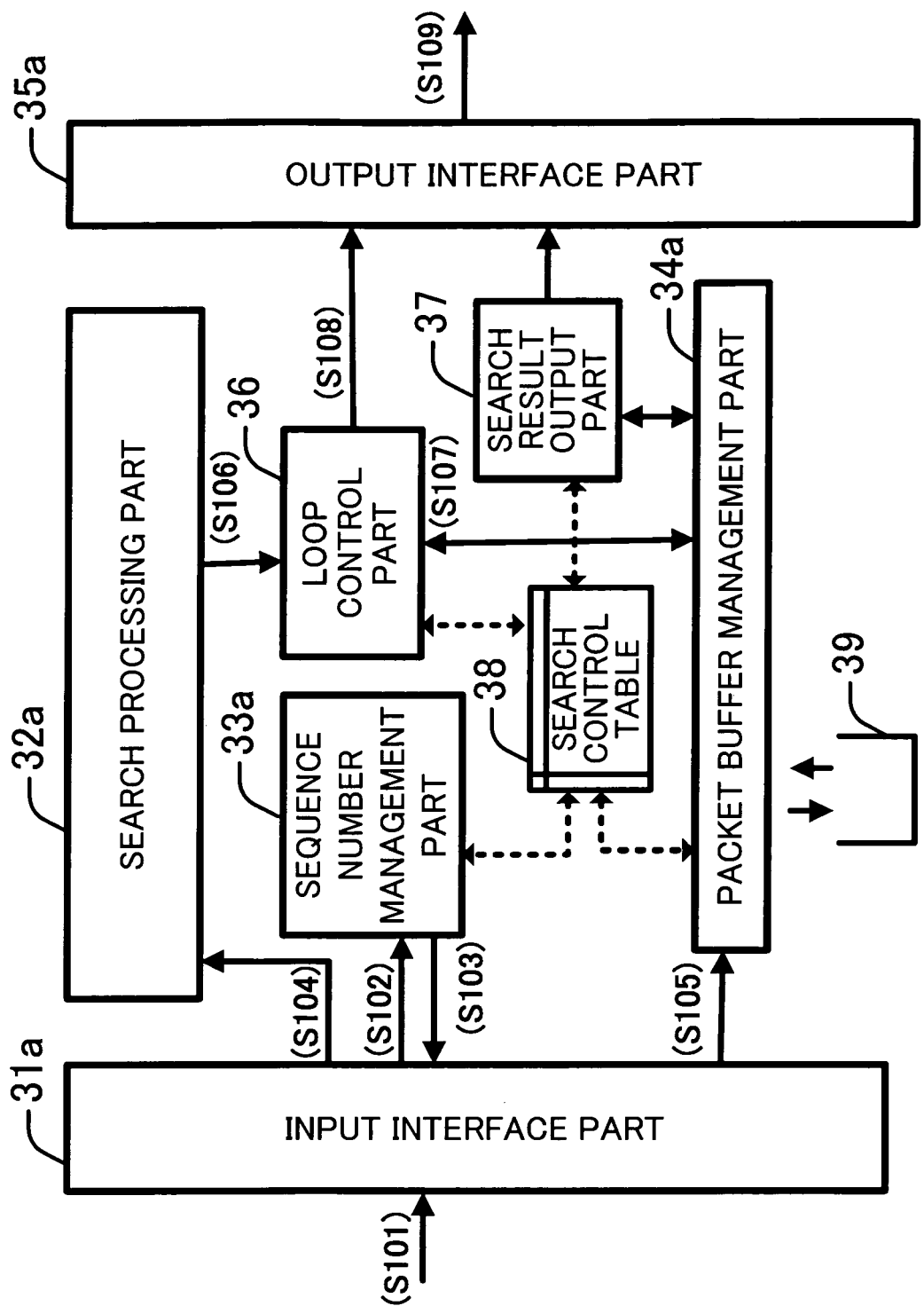
FIG. 13 illustrates an exemplary processing sequence (1) in a search engine according to the second embodiment of the present invention.

FIG. 13 illustrates an exemplary processing sequence (1) in a search engine according to the second embodiment of the present invention, where processing sequences are indicated by processing step numbers appended to data flows (indicated by arrows).

In this case, an initial packet to which no sequence numbers are assigned undergoes loop processing.

In step S101, the input interface part 31a of the search engine 30a receives an initial packet to which no sequence numbers are assigned, i.e., a packet accompanied by a device internal header with the sequence number 302 set at 0, from the packet processing engine 20a via the input port 6a connected to the first communication link.

In step S102, The input interface part 31a notifies reception of the initial packet to the sequence number management part 33a.

In step S103, the sequence number management part 33a assigns a new sequence number which is held in the next sequence number 3820 of the search control table 38 to the initial packet, and notifies the assigned sequence number to the input interface part 31a.

At the same time, the sequence number management part 33a generates a next sequence number, and stores the next sequence number into the next sequence number 3820 of the search control table 38. The next sequence number can be generated by sequentially selecting a natural number from a set of natural numbers (1, 2, ..., n) in cyclic ascending order, for example, 1, 2, ..., n, 1, 2, ... and so on. The sequence number management part 33a initializes the search control record corresponding to the assigned sequence number, and stores the received time of the initial packet into the first received time 3812 of the search control record.

In step S104, the input interface part 31a extracts search key information from the initial packet on the basis of search key pointers included in the device internal header received in step S101, builds a search processing request data including the search request information and the extracted search key information, and sends the search processing request data to the search processing part 32a.

In step S105, the input interface part 31a delivers the received packet and the assigned sequence number to the packet buffer management part 34a. Then, the packet buffer management part 34a stores the packet into the packet buffer 39, and sets the packet pointer 3813 of the search control record at the location (for example, memory address) of the packet.

In step S106, the search processing part 32a executes search processing on the packet, determines whether loop processing on the packet is necessary or not, and delivers loop-determining information to the loop control part 36 along with the search result information.

Since loop processing is necessary in this case, the loop-determining information delivered from the search processing part 32a indicates that loop processing is necessary.

In step S107, the loop control part 36 reads out the packet from the packet buffer 39, increments by 1 the loop counter in the search result information delivered from the search processing part 32a. In this case, since the loop counter 303 of the search request information 300 received from the packet processing engine 20a is set at 0 and the search processing part 32a stores the loop counter value delivered from the input interface part 31a into the search result information to be delivered to the loop control part 36, the loop counter is set at 1.

In step S108, the loop control part 36 builds a search result block, which includes the packet and a device internal header storing the search result information with the loop counter incremented by 1 in step S107, and delivers the search result block to the output interface 35a.

In step S109, the output interface part 35a transmits the search result block to the packet processing engine 20a via the output port corresponding to the number indicated by the loop counter. In this case, the loop counter is set at 1 and the output port is 7-1b.

Figure 14:
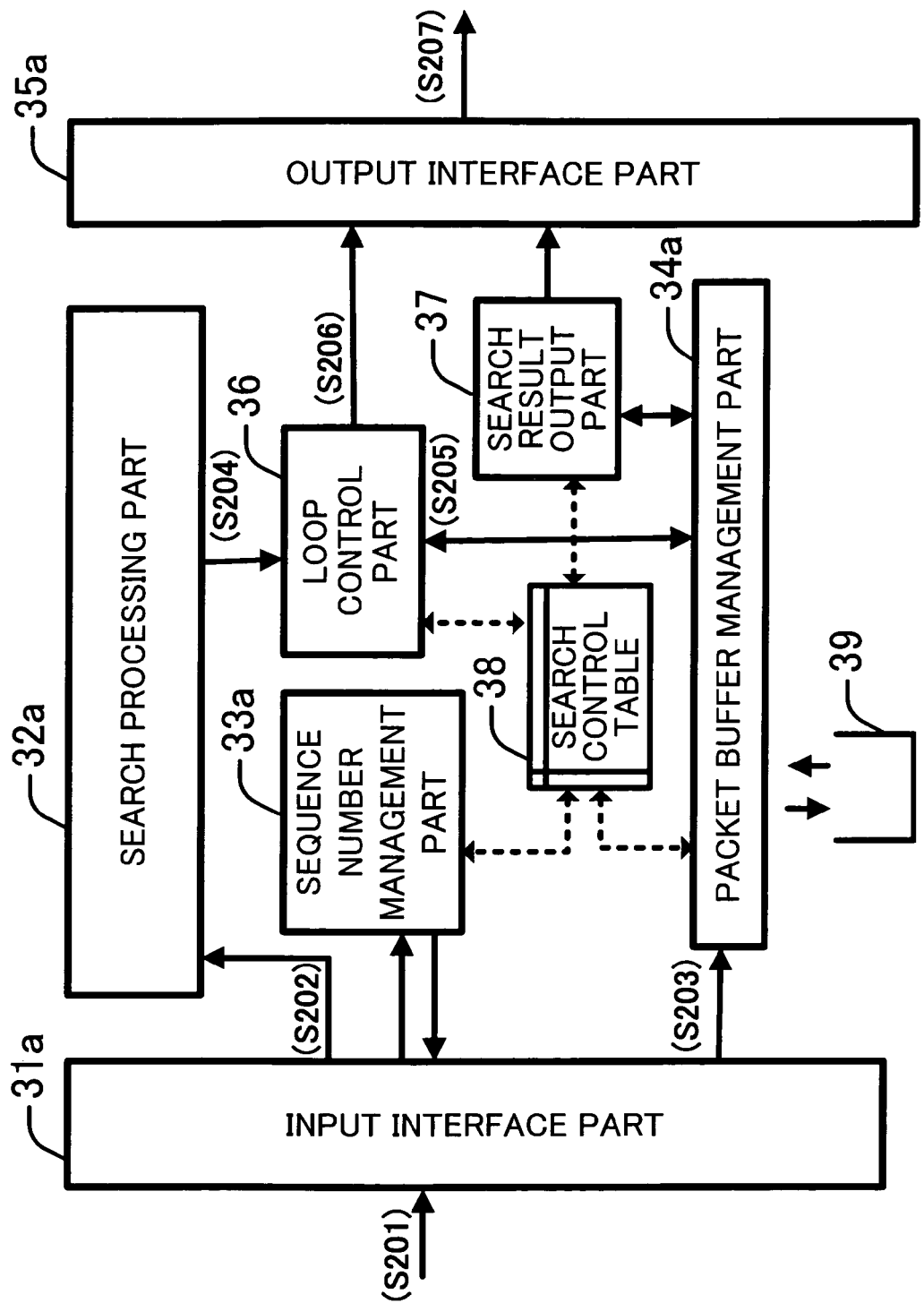
FIG. 14 illustrates an exemplary processing sequence (2) in a search engine according to the second embodiment of the present invention.

FIG. 14 illustrates an exemplary processing sequence (2) in a search engine according to the second embodiment of the present invention, where processing sequences are indicated by processing step numbers appended to data flows (indicated by arrows).

In this case, a packet to which a sequence number was assigned, i.e., a packet which is in loop processing, undergoes further loop processing.

In step S201, the input interface part 31a of the search engine 30a receives a search request block containing a packet to which a sequence number except 0 was assigned. In this case, the sequence number is not equal to 0, meaning that the packet is in loop processing, and the search request block is received via one of the second communication links corresponding to the loop counter value set in the search request information stored in the device internal header. The second communication links consists of N communication links, and the packet in loop processing is transferred between the packet processing engine 20a and the search engine 30a via the communication link corresponding to the loop counter value, i.e., times loop processing is being executed. This allows the search engine 30a to execute maximum N of loop processing concurrently.

In step S202, the input interface part 31a extracts search key information from the packet on the basis of search key pointers included in the device internal header of the search request block, builds search processing request data including the search request information and the extracted search key information, and sends the search processing request data to the search processing part 32a.

In step S203, the input interface part 31a delivers the received packet and the assigned sequence number to the packet buffer management part 34a. The packet buffer management part 34a stores the packet into the packet buffer 39, and sets the packet pointer 3813 of the search control record at the location (for example, memory address) of the packet.

In this case, the search engine 30a can be configured not to store the packet into the packet buffer 39 by holding the initial packet in the packet buffer 39 until the loop processing finishes. Furthermore, the search engine 30a can be configured to overwrite the portion of the packet which may be modified by the search engine 30a during the loop processing onto the packet stored in the packet buffer 39.

In step 204, the search processing part 32a search the data held therein beforehand, on the basis of the search key information included in the search processing request data delivered from the interface part 31a, and delivers search result information to the loop control part 36, where the loop counter in the search result information is set at a value equal to the loop counter value of the search request information delivered from the input interface part 31a. At the same time, the search processing part 32a determines whether loop processing on the packet is needed or not, and delivers a loop-determining information (indicating whether loop processing on the packet is needed or not) to the loop control part 36. Since loop processing is needed in this case, the loop-determining information indicates that loop processing is needed.

In step S205, to continue the loop processing, the loop control part 36 reads out the packet from the packet buffer 39, increments by 1 the loop counter in the search result information delivered from the search processing part 32a.

In step S206, the loop control part 36 builds a search result block, which includes the packet and a device internal header storing the search result information with the loop counter incremented by 1 in step S205, and delivers the search result block to the output interface 35a. In this case, the search result block contains a halfway search result of the packet on which the loop processing has not completed yet.

In step S207, the output interface part 35a transmits the search result block to the packet processing engine 20a via one of the second communication links corresponding to the loop counter value.

Figure 15:
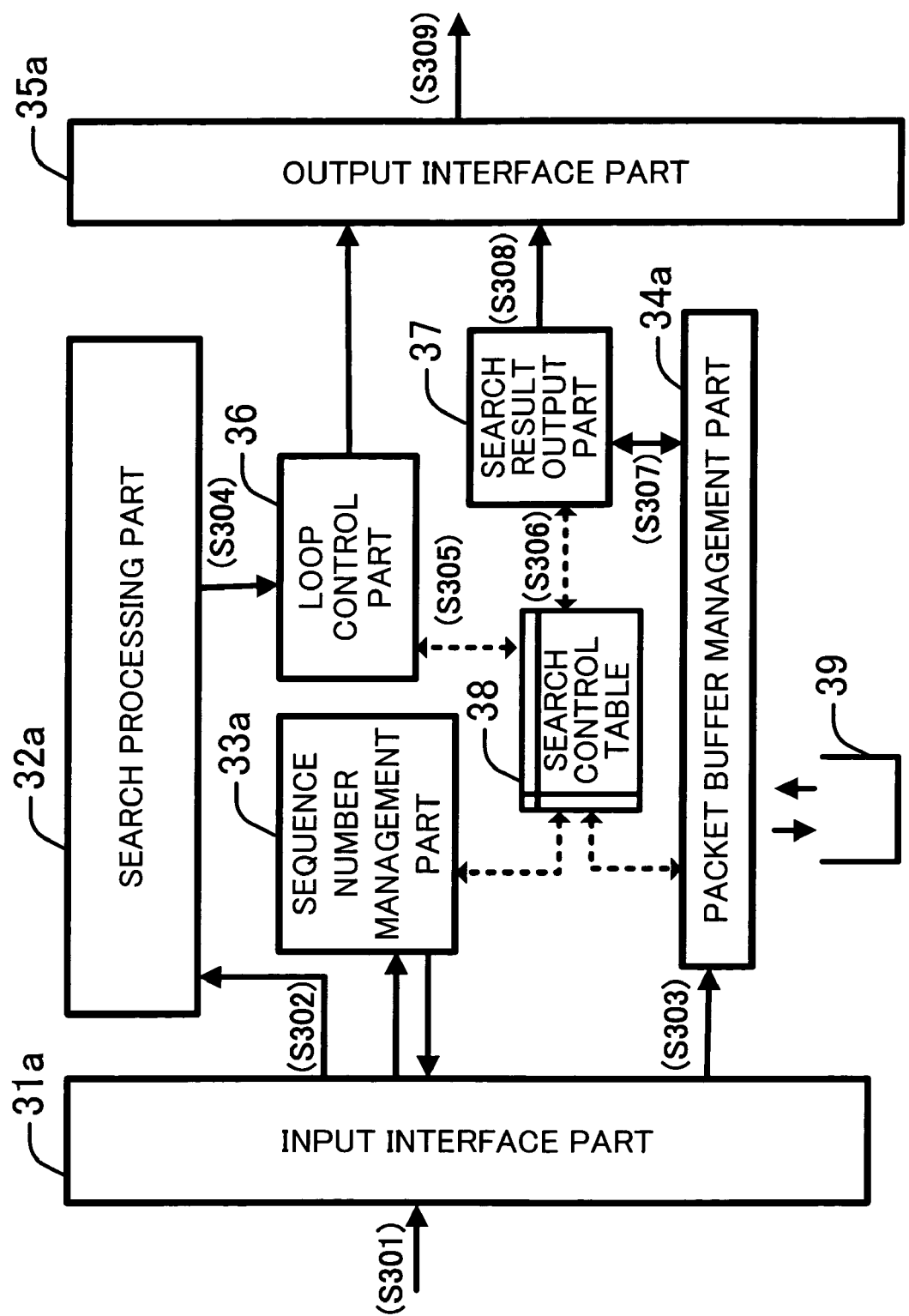
FIG. 15 illustrates an exemplary processing sequence (3) in a search engine according to the second embodiment of the present invention.

FIG. 15 illustrates an exemplary processing sequence (3) in a search engine according to the second embodiment of the present invention, where processing sequences are indicated by processing step numbers appended to data flows (indicated by arrows).

In this case, the search engine 30a processes a packet on which further loop processing is not needed, i.e., loop processing has completed.

In step S301, the input interface part 31a of the search engine 30a receives a search request block containing a packet to which a sequence number except 0 was assigned. In this case, the sequence number is not equal to 0, meaning that the packet is in loop processing.

In step S302, the input interface part 31a extracts search key information from the packet on the basis of search key pointers included in the device internal header of the search request block, builds a search processing request data including the search request information and the extracted search key information, and sends the search processing request data to the search processing part 32a.

In step S303, the input interface part 31a delivers the received packet and the assigned sequence number to the packet buffer management part 34a. The packet buffer management part 34a stores the packet into the packet buffer 39, and sets the packet pointer 3813 of the search control record at the location (for example, memory address) of the packet.

In this case, the input interface part 31a of the search engine 30a can be configured not to store the packet into the packet buffer 39 by holding the initial packet in the packet buffer until the loop processing finishes.

Furthermore, the input interface part 31a can be configured to overwrite the portion of the packet which may be modified by the search engine 30a during the loop processing onto the packet stored in the packet buffer 39.

In step 304, the search processing part 32a search the data held therein beforehand on the basis of the search key-information included in the search processing request data delivered from the interface part 31a, and delivers the search result information to the loop control part 36. At the same time, the search processing part 32a determines whether the further loop processing is needed or not, and delivers a loop-determining information (indicating whether loop processing on the packet is needed or not) to the loop control part 36. Since loop processing is not needed in this case, the loop determining information indicates that loop processing is not needed.

In step S305, to finish the loop processing, the loop control part 36 resets the loop counter (setting at 0) in the search result information delivered from the search processing part 32a, and stores the search result information into the search result information 3815 of the search control record in the search control table 38.

In step S306, the search result output part 37, which is invoked at intervals of a predetermined time, searches search control records in the search control table 38 for the search control record having the oldest first received time, and extracts the search result information from the search result information of the search control record found.

In step S307, the search result output part 37 extracts from the packet buffer 39 the packet pointed by the search control record found in step S306.

In step S308, the search result output part 37 builds a search result block, which includes the packet extracted in step S307 and a device internal header storing the search result information extracted in step S306, and delivers the search result block to the output interface 35a. In this case, the search result block contains final search result information of the packet on which the loop processing has completed.

In step S309, the output interface part 35a transmits the search result block to the packet processing engine 20a via the output port 6b connected to the first communication link.

Although the present invention has been described with particular reference to certain preferred embodiments thereof, variations and modifications of the present invention can be effected within the spirit and scope of the following claims.

What is claimed is:

1. A packet processing apparatus for transferring a packet received from one or more receiving ports, comprising:
   a packet processing engine performing packet processing on the packet;
   a search engine performing search processing on the packet; and
   a bus connecting the packet processing engine and the search engine, the bus having a bandwidth which is equal to or greater than a total transmission bandwidth of the one or more receiving ports, wherein
   the packet processing engine is configured to append a device internal header containing a search key to the packet received from the one or more receiving ports, transfer the packet appended with the device internal headers to the search engine through the bus, and receive the packet whose device internal header is provided with search result information from the search engine through the bus, and
   the search engine is configured to include:
   a packet buffer temporarily storing the packet transferred from the packet processing engine through the bus;
   a search processing part performing search processing on the basis of the search key in the device internal header;
   a sequence number management part providing a sequence number to the packet received from the packet processing engine;
   a loop control part performing packet loop processing on the packet on the basis of the sequence number, the packet loop processing stepwise appending search processing to the packet by transferring the packet repeatedly between the packet processing engine and the search engine; and
   a search result output part transmitting search result information of the packet on which the loop processing has completed to the packet processing engine, in ascending order of a first received time of the packet from the packet processing engine, the first received time of the packet indicating a received time of the packet before the loop processing begins.

2. The packet processing apparatus of claim 1, wherein the bus includes:
   a first communication link transferring the packet and the device internal header between the packet processing engine and the search engine before the loop processing on the packet begins or after the loop processing on the packet has completed; and
   one or more second communication links transferring the packet in loop processing, the second communication links each corresponding to a current loop count of the packet on which the loop processing is being executed, the packet in loop processing being transferred between the packet processing engine and the search engine via one of the second communication links corresponding to the current loop count of the packet in loop processing.

3. The packet processing apparatus of claim 1, wherein the search engine further includes a scheduler selecting an output queue corresponding to the packet on the basis of the search result information from the search processing part and performing scheduling for each output queue so as to transfer the packets to the packet processing engine.

4. The packet processing apparatus of claim 1, further comprising error check means for performing an error check on at least a data portion which is changed in the device internal header and the packet.

5. The packet processing apparatus of claim 1, wherein the search engine includes search control records each storing the first received time of the packet and the search result information of the packet on which the loop processing has completed in association with the sequence number, and wherein
the search result output part extracts a search control record having the oldest first received time from the search control records, determines whether a predetermined waiting time has elapsed or not on the basis of a current time and the first received time of the search control record extracted, and transmits the packet to the packet processing engine along with the search result information when the predetermined waiting time has elapsed.

6. A method for transferring a packet using a packet processing engine and a search engine, the method comprising:
performing, by the packet processing engine, packet processing on the packet;
appending, by the packet processing engine, a device internal header containing a search key to the packet;
transmitting, by the packet processing engine, the packet appended with the device internal header to the search engine;
assigning, by the search engine, a sequence number to the packet received from the packet processing engine;
performing, by the search engine, packet loop processing on the packet on the basis of the sequence number, the packet loop processing stepwise appending search processing to the packet by transferring the packet repeatedly between the packet processing engine and the search engine;
transmitting, by the search engine, search result information of the packet on which the loop processing has completed to the packet processing engine, in ascending order of a first received time of the packet from the packet processing engine, the first received time of the packet indicating a received time of the packet before the loop processing begins;
receiving, by the packet processing engine, the packet appended with the device internal header including the search result information from the search engine; and
performing, by the packet processing engine, packet processing on the packet received from the search engine.

7. The method of claim 6, wherein the packet and the device internal header are transferred via a first communication link between the packet processing engine and the search engine, before the loop processing on the packet begins or after the loop processing on the packet has completed, and
the packet and the device internal header are transferred via the one or more second communication links between the packet processing engine and the search engine while the loop processing on the packet is being executed.

8. The method of claim 7, wherein each of the one or more second communication links corresponds to a current loop count of the packet on which the loop processing is being performed, and the packet in loop processing is transferred between the packet processing engine and the search engine via one of the second communication links corresponding to the current loop count of the packet in loop processing.

9. The method of claim 6, wherein the search engine selects an output queue corresponding to the packet on the basis of search result of the search processing, and performs scheduling for each output queue so as to transfer the packet to the packet processing engine.

10. The method of claim 6, wherein error check processing on at least a data portion which is changed in the device internal header and the packet is performed.

11. The method of claim 6, wherein the search engine includes search control records each storing the first received time of the packet and the search result information of the packet on which the loop processing has completed in association with the sequence number, extracts a search control record having the oldest first received time from the search control records, determines whether a predetermined waiting time has elapsed or not on the basis of a current time and the first received time of the search control record extracted, and transmits the packet to the packet processing engine along with the search result information when the predetermined waiting time has elapsed.

* * * * *